(12) United States Patent
Witzke et al.

(10) Patent No.: US 12,503,655 B2
(45) Date of Patent: Dec. 23, 2025

(54) ISOMERIZATION OF BIOFEEDS OVER BASE METAL CATALYSTS

(71) Applicant: EXXONMOBIL TECHNOLOGY AND ENGINEERING COMPANY, Annandale, NJ (US)

(72) Inventors: Megan E. Witzke, Bedminster, NJ (US); Randolph J. Smiley, Hellertown, PA (US); Chuansheng Bai, Phillipsburg, NJ (US); Scott J. Weigel, Allentown, PA (US); Xiaochun Xu, Basking Ridge, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 140 days.

(21) Appl. No.: 18/393,101

(22) Filed: Dec. 21, 2023

(65) Prior Publication Data

US 2024/0218260 A1   Jul. 4, 2024

Related U.S. Application Data

(60) Provisional application No. 63/477,602, filed on Dec. 29, 2022.

(51) Int. Cl.
*C10G 3/00* (2006.01)
*B01J 8/04* (2006.01)
(Continued)

(52) U.S. Cl.
CPC .............. *C10G 3/49* (2013.01); *B01J 8/0415* (2013.01); *B01J 23/883* (2013.01);
(Continued)

(58) Field of Classification Search
CPC .... C10G 3/46; C10G 3/50; C10G 2300/1011; C10G 2300/202; C10G 2300/301;
(Continued)

(56) References Cited

U.S. PATENT DOCUMENTS

| 8,674,160 B2 | 3/2014 | Hanks et al. |
| 8,722,563 B2 | 5/2014 | Soled et al. |

(Continued)

FOREIGN PATENT DOCUMENTS

| WO | 2008/058664 A1 | 5/2008 |
| WO | 2017/112558 A1 | 6/2017 |

(Continued)

OTHER PUBLICATIONS

International Search Report and Written Opinion received for PCT Patent Application No. PCT/US2023/085394, mailed on Apr. 18, 2024, 11 pages.

(Continued)

*Primary Examiner* — Randy Boyer
*Assistant Examiner* — Juan C Valencia
(74) *Attorney, Agent, or Firm* — Shook Hardy & Bacon L.L.P.

(57) ABSTRACT

An isomerization catalyst is provided, along with corresponding systems and methods, which provides improved isomerization for bio-derived feeds in reaction environments where by-products from deoxygenation are present. The catalyst provides unexpectedly increased activity and/or selectivity in situations where, for example, a deoxygenation effluent is cascaded to the isomerization catalyst. Additionally, the isomerization catalyst can assist with reducing or minimizing hydrogen consumption during isomerization. The increased activity, stability, and/or reduced hydrogen consumption is achieved in part based on using a dispersion agent when adding base metals to the catalyst. In addition to (Continued)

the base metals, the catalyst includes a zeolitic framework structure suitable for isomerization.

20 Claims, 7 Drawing Sheets

(51) Int. Cl.
    *B01J 23/883*     (2006.01)
    *B01J 29/78*     (2006.01)

(52) U.S. Cl.
    CPC ............ *B01J 29/7861* (2013.01); *C10G 3/46* (2013.01); *C10G 3/50* (2013.01); *C10G 2300/1014* (2013.01); *C10G 2300/202* (2013.01); *C10G 2300/304* (2013.01); *C10G 2300/70* (2013.01)

(58) Field of Classification Search
    CPC .... C10G 2300/4006; C10G 2300/4012; C10G 2300/70; C10G 2400/04; C10G 2400/08; C10G 65/043; C10G 65/12; C10G 45/58; C10G 45/64; B01J 23/883; B01J 29/7861; Y02P 30/20
See application file for complete search history.

(56) References Cited

U.S. PATENT DOCUMENTS

| | | |
|---|---|---|
| 8,816,141 B2 | 8/2014 | Cole et al. |
| 9,598,645 B2 | 3/2017 | Hanks et al. |
| 10,035,962 B2 | 7/2018 | Podsiadlo et al. |
| 10,669,491 B2 | 6/2020 | Mccarthy et al. |
| 10,888,850 B2 | 1/2021 | Bai et al. |
| 2011/0219669 A1 | 9/2011 | Hanks et al. |
| 2011/0219671 A1* | 9/2011 | Hanks ...................... C10G 3/47 44/307 |
| 2013/0261362 A1 | 10/2013 | Fingland et al. |
| 2015/0175911 A1 | 6/2015 | Shih et al. |
| 2017/0175011 A1 | 6/2017 | Mccarthy et al. |
| 2018/0318811 A1* | 11/2018 | Bai ...................... B01J 37/0203 |

FOREIGN PATENT DOCUMENTS

| | | |
|---|---|---|
| WO | 2018/185200 A1 | 10/2018 |
| WO | 2019/084657 A1 | 5/2019 |
| WO | 2020/168418 A1 | 8/2020 |
| WO | 2021/060158 A1 | 4/2021 |
| WO | 2021/260158 A1 | 12/2021 |

OTHER PUBLICATIONS

International Search Report and Written Opinion received for PCT Patent Application No. PCT/US2023/085395, mailed on Apr. 23, 2024, 14 pages.
International Search Report and Written Opinion received for PCT Patent Application No. PCT/US2023/085396, mailed on Apr. 18, 2024, 13 pages.
Lingmei et al., "Citric-acid-induced mesoporous SAPO-11 loaded with highly dispersed nickel for enhanced hydroisomerization of oleic acid to iso-alkanes", Fuel Processing Technology, vol. 187, Jan. 31, 2019, pp. 52-62.
Weston et al., "EMM-17, a New Three-Dimensional Zeolite with Unique 11-Ring Channels and Superior Catalytic Isomerization Performance", Journal of the American Chemical Society, vol. 141, No. 40, Sep. 11, 2019, pp. 15910-15920.
Non-Final Office Action received for U.S. Appl. No. 18/393,152, mailed on Jul. 16, 2025, 11 pages.
Notice of Allowance received for U.S. Appl. No. 18/393,152, mailed on Sep. 12, 2025, 9 pages.

* cited by examiner

ISOMERIZATION OF BIOFEEDS OVER BASE METAL CATALYSTS

CROSS-REFERENCE TO RELATED APPLICATION

This application claims the benefit of U.S. Provisional Application No. 63/477,602, filed Dec. 29, 2022, the entirety of which is hereby incorporated by reference.

FIELD OF THE INVENTION

Systems, methods, and corresponding catalyst compositions are provided for isomerization of feeds containing at least a portion of one or more bio-derived feedstocks using a base metal catalyst.

BACKGROUND OF THE INVENTION

Distillate fuels, such as jet fuels and diesel fuels, have traditionally been produced by processing of mineral petroleum feeds in a refinery setting. As bio-derived fuels increase in importance, it would be beneficial to be able to use existing types of refinery systems to form bio-derived distillate fuels. For example, being able to use existing types of refinery equipment can allow for substantial cost savings when such existing equipment can be converted from use in processing of mineral fractions to use in processing of at least partially bio-derived fractions.

Due to the high oxygen content of bio-derived feedstocks, processing of bio-derived feedstocks to form distillate fuel or fuel blending products typically involves some type of deoxygenation. Additionally, because many type of bio-derived feedstocks include substantial amounts of long, unbranched alkyl groups, dewaxing to improve cold flow properties of the resulting distillate fuel or fuel blending product(s) can also be beneficial.

International Publication WO/2021/060158 describes a method for selective decarboxylation of oxygenate feeds. The method is described as being useful for reducing the boiling range of a distillate fuel derived from a biological source. Reducing the boiling range is valuable when attempting to increase the yield of jet fuel produced from a bio-derived feedstock, such as soybean oil, that includes a substantial amount of glycerides and/or methyl esters with $C_{18}$ carbon chains. The decarboxylation is achieved by first saturating the bio-derived feed, and then performing deoxygenation in the presence of a supported catalyst that includes nickel, such as a supported NiMo catalyst.

U.S. Pat. No. 8,816,141 describes deoxygenation of a bio-derived feed under conditions that result in reduced hydrogen consumption. The reduced hydrogen consumption is achieved by performing the deoxygenation in the presence of a catalyst including Co and/or Mo with a relatively low amount of hydrogen treat gas relative to the full stoichiometric need for hydrotreatment of the feedstock.

U.S. Pat. No. 8,722,563 describes synthesis and use of bulk hydroprocessing catalysts.

U.S. Patent Application Publication 2013/0261362 describes co-processing of biofeeds with bulk mixed metal catalysts.

U.S. Pat. No. 9,598,645 describes co-processing of biofeeds with group VI metal catalysts.

U.S. Pat. No. 8,674,160 describes methods for dewaxing of renewable diesel fuel. Examples are provided for dewaxing of deoxygenated bio-derived feeds over both noble metal and base metal catalysts.

U.S. Pat. No. 10,669,491 describes base metal dewaxing catalysts. In some aspects, the catalysts are formed using a dispersion agent.

U.S. Pat. No. 10,888,850 describes dewaxing catalysts formed using a dispersion agent. The dewaxing catalysts are used for performing both hydrodesulfurization and dewaxing of mineral feeds. The dewaxing catalysts include a Group 8-10 noble metal, a Group 8-10 base metal, and a Group 6 metal. Comparative catalysts including a Group 8-10 base metal and a Group 6 metal are also described.

U.S. Pat. No. 10,035,962 describes trim dewaxing of distillate fuel. In some aspects, a dewaxing catalyst made using a dispersion agent is described.

SUMMARY OF THE INVENTION

In an aspect, a method for processing a bio-derived feedstock is provided. The method includes exposing a feed that includes a bio-derived feedstock to an isomerization catalyst that includes a zeolitic framework structure, at least one Group 6 metal, and at least one Group 8-10 metal under isomerization conditions to form an isomerized effluent. The isomerization catalyst can have a ratio of metal layer locations comprising a single layer to metal layer locations comprising two layers of 1.1 or more. Optionally, the feed can include 1.0 wt % or of organic oxygen. Optionally, the cloud point of the isomerized effluent can be lower than the cloud point of the feed by 10° C. or more.

In another aspect, an isomerization catalyst is provided. The isomerization catalyst includes a zeolitic framework structure, a binder, at least one first catalytic metal selected from Mo and W, and at least one second catalytic metal selected from Ni and Co. In some aspects, the zeolitic framework structure can correspond to MWW, MTW, FAU, FER, the framework structure corresponding to EMM-17, or a combination thereof. The catalyst can have a combined weight of the at least one first catalytic metal and the at least one second catalytic metal of 1.0 wt % to 30 wt % relative to a weight of the catalyst. Additionally, the catalyst can have a ratio of metal layer locations comprising a single layer to metal layer locations comprising two layers of 1.1 or more. A method of making such a catalyst using a dispersion agent is also provided.

DETAILED DESCRIPTION OF THE EMBODIMENTS

Figure 1:
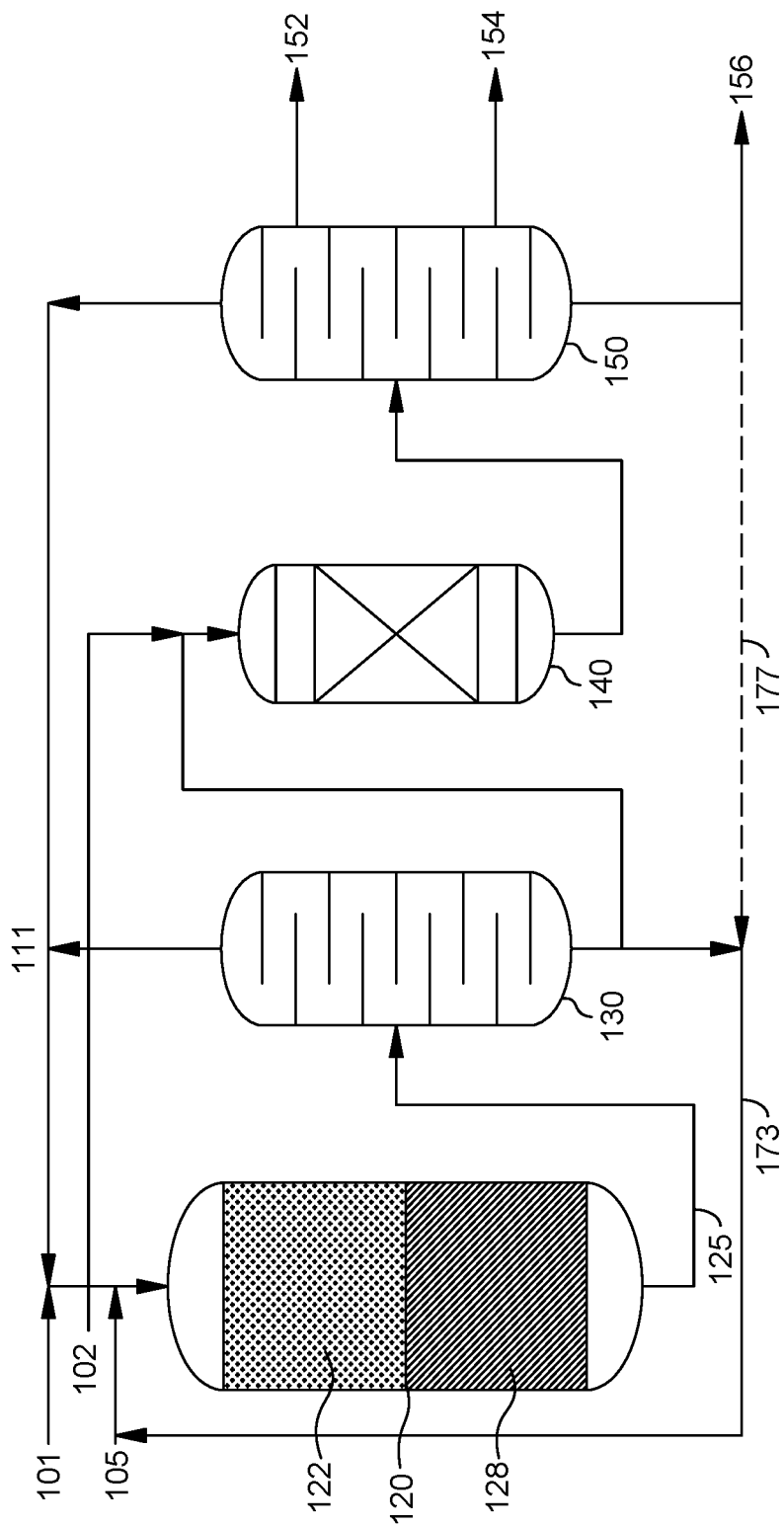
FIG. 1 shows an example of a configuration for using a supported catalyst and a bulk multimetallic base metal catalyst in a reactor or reaction stage for processing of a feed containing a bio-derived component.

All numerical values within the detailed description and the claims herein are modified by "about" or "approximately" the indicated value, and take into account experimental error and variations that would be expected by a person having ordinary skill in the art.

Overview

In various aspects, an isomerization catalyst is provided, along with corresponding systems and methods, which provides improved isomerization for bio-derived feeds in reaction environments where by-products from deoxygenation are present. The catalyst provides unexpectedly increased activity and/or selectivity in situations where, for example, a deoxygenation effluent is cascaded to the isomerization catalyst. The increased selectivity refers to the ability to reduce or minimize formation of $C_1$-$C_4$ hydrocarbons (i.e., light ends) during the isomerization process. Additionally, isomerization catalyst can assist with reducing or minimizing hydrogen consumption during isomerization, such as in situations where a reduced amount of organic oxygen (compared to before HDO in the first reactor) and/or a residual organic oxygen content is still present in the feed during isomerization. The increased activity, stability, and/or reduced hydrogen consumption is achieved in part based on using a dispersion agent when adding base metals to the catalyst. In addition to the base metals, the catalyst includes a zeolitic framework structure suitable for isomerization. Examples of such zeolitic framework structures, can include, but are not limited to, zeolitic framework structures including 10-, 11-, and 12-member ring pore channels. Some examples of such framework structures are MEL (e.g., ZSM-11), MTW (e.g., ZSM-12), TON (e.g., ZSM-22), MTT (e.g., ZSM-23), FER (e.g., ZSM-35), MRE (e.g., ZSM-48), MFS (e.g., ZSM-57), FAU (e.g., zeolite Y, beta, Mordenite), EMM-17, MWW (e.g., MCM-49), and co-extrudates (combinations) of these zeolites, respectively. In some aspects, the framework structure can correspond to MEL, FAU, MWW, EMM-17, or combinations thereof. In some aspects, the framework structure can correspond to MEL, FAU, MWW, MRE, EMM-17, or combinations thereof. In some aspects, the framework structure can correspond to MWW (e.g., MCM-49), FAU (e.g., zeolite Y or USY), MTW (e.g., ZSM-12), the framework structure corresponding to EMM-17, or combinations thereof. In some aspects, the framework structure can correspond to MWW (e.g., MCM-49), FAU (e.g., zeolite Y or USY), MTW (e.g., ZSM-12), EMM-17, FER (e.g., ZSM-35), MFS (e.g., ZSM-57), or combinations thereof.

Additionally or alternately, in various aspects, systems and methods are provided for reducing hydrogen consumption during deoxygenation of bio-derived (or at least partially bio-derived) feedstocks. The reduced hydrogen consumption is achieved by performing the deoxygenation in the presence of a bulk multimetallic catalyst. Additionally, due in part to being able to reduce or minimize hydrogen consumption, the heat release during deoxygenation can also be reduced, thus allowing a smaller catalyst volume to perform deoxygenation.

Still further benefits can be achieved when the bulk multimetallic catalyst is used in combination with an isomerization catalyst, such as a zeolitic isomerization catalyst with supported base metals having high metal dispersion. Such a base metal zeolitic isomerization catalyst can provide high activity for both deoxygenation and dewaxing while being tolerant of the water/other components present in a deoxygenation environment. This can allow the zeolitic base metal isomerization catalyst to be used downstream from the bulk multimetallic catalyst without requiring an intermediate separation.

One of the challenges with increasing the availability of bio-derived fuels is having sufficient resources to process the feedstocks. This can include both having sufficient refinery space as well as having sufficient supplemental inputs, such as hydrogen.

It has been discovered that a base metal isomerization catalyst that is formed using a dispersion agent during deposition (such as impregnation) of the base metals on the catalyst can provide a variety of advantages for isomerization of bio-derived feedstocks. For example, one of the difficulties with isomerization of bio-derived feedstocks is that residual organic oxygen may remain in the feed after deoxygenation. This leads to creation of water and carbon oxides during isomerization as this remaining organic oxygen is removed from the feedstock. Additional water and/or carbon oxides can also be present if a deoxygenation effluent is cascaded to the catalyst, or if the deoxygenation process removes less oxygen than expected for any reason. For many types of isomerization catalysts, water and/or carbon oxides can reduce or minimize the activity of the isomerization catalyst. It has been discovered that base metal isomerization catalysts on zeolitic supports can maintain activity and/or catalyst lifetime at an unexpectedly high level in the presence of water and/or carbon oxides.

It has further been discovered that the selectivity for formation of light ends is reduced or minimized when using a base metal zeolitic isomerization catalyst that is formed using a dispersion agent. It has still further been discovered that base metal isomerization catalysts with increased metal dispersion can also reduce or minimize the hydrogen consumption required for performing isomerization on a bio-derived feedstock when at least some organic oxygen is present. It has been discovered that base metal isomerization catalysts with increased metal dispersion have an unexpected selectivity for converting organic oxygen via a decarboxylation reaction pathway, as opposed to a decarbonylation or a hydrodeoxygenation pathway.

Additionally or alternately, it has also been discovered that a bulk multimetallic catalyst can assist with managing the resources that are needed for processing of bio-derived feedstocks. The bulk multimetallic catalyst can perform deoxygenation while using an unexpectedly low amount of hydrogen. This can reduce or minimize the amount of hydrogen needed for converting an initial bio-derived feedstock into an at least partially deoxygenated intermediate or product.

A second benefit of the bulk multimetallic catalyst is an unexpectedly high activity for deoxygenation. This can reduce the severity of the hydroprocessing conditions that are needed for performing deoxygenation, which can improve catalyst lifetime, thus reducing catalyst turnaround costs. Additionally, in combination with the low hydrogen consumption, which provides a correspondingly low heat release during deoxygenation, the bulk multimetallic catalyst can perform deoxygenation in a reduced or minimized volume in a reactor.

The ability to perform deoxygenation in a reduced or minimized volume can be beneficial, for example, for retrofitting existing hydroprocessing reactors for processing of bio-derived feedstocks. Due in part to the high heat release when deoxygenation is performed using conventional catalysts, the reactor volumes required for distillate fuel production from bio-derived feedstocks can be larger than the reactor volumes for processing of typical mineral feeds. This can create difficulties when attempting to retrofit existing reactors for processing of bio-derived feeds, as expanding the available reactor volume is typically more expensive than repurposing existing reactor volume.

An additional advantage of being able to use a reduced catalyst volume for deoxygenation is that the reduced deoxygenation catalyst volume can create available volume for isomerization catalyst. This can allow an isomerization catalyst that is tolerant of deoxygenation products to be used in the same reactor, so that both deoxygenation and dewaxing are performed in a single reactor and/or a single reaction stage without separation.

In some aspects, still further benefits can be gained by reducing the volume of bulk multimetallic catalyst and/or reducing the severity during deoxygenation so that a portion of the deoxygenation is performed by the isomerization catalyst, such as a base metal isomerization catalyst with high metal dispersion. This can allow substantially complete deoxygenation to be achieved in a limited volume while also improving the cold flow properties of the hydrocarbons in the resulting isomerized, deoxygenated effluent.

In some aspects, the deoxygenated, isomerized effluent can be fractionated to form one or more distillate fractions, such as a jet boiling range fraction, a diesel boiling range fraction, or a combination thereof. A jet boiling range fraction can have a T10 distillation point of 121° C. or higher, as measured according to ASTM D2887, and/or a T90 distillation point of 300° C. or lower. In some aspects, a distillate fraction can correspond to a diesel boiling range fraction, with a T10 distillation point of 200° C. or higher, as measured according to ASTM D2887, and/or a T90 distillation point of 343° C. or less. In some aspects, a distillate fraction can correspond to a combination of jet and diesel boiling range components, with a T10 distillation point of 121° C. or higher, as measured according to ASTM D2887, and/or a T90 distillation point of 343° C. or less.

Feedstocks

In this discussion, a bio-derived feed or feedstock refers to a hydrocarbon feedstock derived at least in part from a biological raw material component, such as vegetable fats/oils or animal fats/oils, fish oils, pyrolysis oils, and algae lipids/oils, as well as components of such materials, and in some embodiments can specifically include one or more types of lipid compounds.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil. Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities. It is noted that either vegetable oils or animal fats may correspond to oils/fats that have been previously used, such as used or spent cooking oils/fats from food processing facilities or restaurants. Animal fats as referred to herein also include processed animal fat material. Non-limiting examples of processed animal fat material include fatty acids and fatty acid alkyl esters. Alkyl esters typically include $C_1$-$C_8$ alkyl esters. One or more of methyl, ethyl, and propyl esters are preferred.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof.

Other bio-derived feeds or feedstocks can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. If triglycerides are present, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Still another example of a bio-derived feedstock can be a recycled portion of the effluent from a process for deoxygenation and/or isomerization of a bio-derived feedstock. In order to manage reaction heat release within catalyst beds, portions of the effluent from hydroprocessing of bio-derived feeds can be recycled for use as a co-feed. Such recycle can reduce the oxygen content of an overall feed while avoiding the need to introduce a mineral feedstock as a co-feed.

In various aspects, the feed can include 1.0 wt % or more of feedstock derived from a biological source, or 5.0 wt % or more, or 10 wt % or more, or 20 wt % or more, or 40 wt % or more, or 60 wt % or more, or 80 wt % or more, such as up to having a feed that is substantially composed of bio-derived feedstock (~100 wt %). Additionally or alternately, in some aspects the feed can include 20 wt % or more of fresh bio-derived feedstock, or 30 wt % or more, or 40 wt % or more, or 50 wt % or more, such as up to being substantially composed of fresh bio-derived feedstock. For example, the feed can include 20 wt % to 80 wt % of fresh bio-derived feedstock, or 20 wt % to 60 wt %, or 20 wt % to 50 wt %, or 30 wt % to 80 wt %, or 30 wt % to 60 wt %. In this discussion, fresh bio-derived feedstock is defined as bio-derived feedstock that is not recycled from a hydroprocessing effluent. Optionally, the bio-derived feedstock can include 1.0 wt % or more of glycerides, lipids, fatty acids, fatty acid esters (such as fatty acid alkyl esters), or a combination thereof. The glycerides can include monoglycerides, diglycerides, or triglycerides. For example, the bio-derived feedstock can include 5 wt % or more, or 10 wt % or more, or 20 wt % or more of glycerides, lipids, fatty acids, fatty acid esters, fatty acid alkyl esters, or a combination thereof. In some aspects, the bio-derived feedstock can include 1.0 wt % to 75 wt % of glycerides, or 1.0 wt % to 50 wt %, or 1.0 wt % to 30 wt %, or 10 wt % to 75 wt %, or 10 wt % to 50 wt %, or 10 wt % to 30 wt %.

Bio-derived feedstocks can have a wide range of nitrogen and/or sulfur contents. For example, a bio-derived feedstock based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a bio-derived feedstock can also vary. In some embodiments, the sulfur content can be 500 wppm or less, for example 100 wppm or less, or 50 wppm or less, or 10 wppm or less, such as down to having substantially no sulfur content (0.1 wppm or less). It is noted that some bio-derived feeds can also include 0.05 wt % or more of phosphorus. It is further noted that some bio-derived feeds can contain trace amounts (or more) of some metals, such as Na, K, Fe, and/or Co.

It is noted that catalysts for performing deoxygenation often correspond to catalysts having sulfided metals, with the sulfided metals corresponding to the active state of the catalyst. When a sulfided catalyst is used to perform hydroprocessing on a feed that has a relatively low sulfur content, the sulfur content of the feed may be sufficiently low so that the metals on the catalyst will convert to oxides and/or to a reduced state during hydroprocessing. This can reduce, minimize, or even eliminate the activity of a catalyst for performing deoxygenation. Additionally or alternately, this can alter the reaction pathway used for deoxygenation during hydroprocessing to a reaction pathway that results in higher hydrogen consumption. To avoid these deactivation and/or increased hydrogen consumption problems, in some aspects additional sulfur can be added to the processing environment to maintain a deoxygenation catalyst or an isomerization catalyst in a sulfided state. One option for adding sulfur is to add an organic sulfur reagent, such as dimethyl disulfide (DMDS). Such a reagent can be added to maintain an organic sulfur level in the reaction environment of 50 wppm or more, or 100 wppm or more, or 250 wppm or more, or 400 wppm or more, such as up to 500 wppm or another convenient target amount. Additionally or alternately, gas phase sulfur can be introduced into the reaction environment, such as by adding $H_2S$. The $H_2S$ can be part of a recycled $H_2$ stream that is used for deoxygenation and/or isomerization, or the $H_2S$ can be added separately, or the $H_2S$ can be added in any other convenient manner. The added $H_2S$ can provide an $H_2S$ content in the reaction environment of 0.1 vol % or more, or 0.5 vol % or more, or 1.0 vol % or more, such as up to 2.5 vol % or possibly still higher.

It is further noted that the conditions for performing deoxygenation also roughly correlate with conditions for performing hydrodesulfurization and/or hydrodenitrogenation. Thus, even if a feed initially has a sulfur content of 100 wppm or more, or 250 wppm or more prior to deoxygenation, in some aspects the resulting deoxygenated effluent can have a sulfur content of 250 wppm or less, or 100 wppm or less, or 50 wppm or less, or 10 wppm or less. In such aspects, if sufficient $H_2S$ is created during deoxygenation, and if the deoxygenated effluent is passed to the isomerization catalyst without intermediate separation, the $H_2S$ from deoxygenation can serve as a source of sulfur for base metal-added isomerization catalysts. In other aspects, it may be necessary to add organic sulfur or a gas phase sulfur source for base metal-added isomerization catalysts even though sufficient sulfur was present for the deoxygenation process.

Aside from nitrogen and sulfur, oxygen can be another heteroatom component in bio-derived feedstocks. Prior to hydrotreatment, a bio-derived feedstock based on a vegetable oil can include up to about 10 wt % oxygen, for example up to about 12 wt % or up to about 14 wt %. Additionally or alternatively, such a bio-derived feedstock can include 1.0 wt % or more of oxygen, or 2.0 wt % or more, or 4.0 wt % or more, or 6.0 wt % or more. It is further noted that combining a recycled bio-derived stream based on a hydroprocessing effluent can typically have a relatively low oxygen content. Thus, one option for controlling the oxygen content of a feed can be to combine a portion of fresh bio-derived feed with a recycle fraction.

In some alternative aspects, a bio-derived feed can be co-processed with a mineral feedstock. A mineral feedstock refers to a conventional (e.g., non-bio-derived) feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof.

Mineral feedstocks for blending with a bio-derived feedstock can have a nitrogen content from 50 wppm to 2000 wppm nitrogen, for example from 50 wppm to 1500 wppm or from 75 to 1000 wppm. In some embodiments, the mineral feedstock can have a sulfur content from 100 wppm to 10,000 wppm sulfur, for example from 200 wppm to 5,000 wppm or about 350 wppm to 2,500 wppm. Additionally or alternatively, the combined (bio-derived plus mineral) feedstock can have a sulfur content of 5.0 wppm or more, or 10 wppm or more, or 25 wppm or more, or 100 wppm or more, or 500 wppm or more, or 1000 wppm or more. Further additionally or alternatively, the combined feedstock can have a sulfur content of 2000 wppm or less, or 1000 wppm or less, or 500 wppm or less, or 100 wppm or less, or 50 wppm or less.

Mechanisms for Deoxygenation

In various aspects, a bulk multimetallic catalyst can be used for deoxygenation of a feed including at least a portion of a bio-derived feedstock. It has been discovered that bulk multimetallic catalysts preferentially cause deoxygenation via decarboxylation, which results in reduced hydrogen consumption during deoxygenation.

The deoxygenation benefit can be understood using soybean oil as an example. Soybean oil is primarily composed of triglycerides having 3 $C_{18}$ carbon chains. The $C_{18}$ carbon chains are each linked to a propyl backbone via an ester linkage. This means that each triglyceride molecule contains a total of 6 oxygen atoms that need to be removed. There are three potential reaction mechanisms for removing these oxygen atoms.

Mechanism 1: Hydrodeoxygenation. In this mechanism, the oxygens are removed by forming water molecules. If all oxygens are removed in this manner, a total of six water molecules are formed, requiring six $H_2$ to form the water. Additionally, removing the oxygen atoms as water means that all of the prior C—O bonds in the triglyceride have to be replaced with C—H bonds. This requires an additional hydrogen, so that a total of 16 $H_2$ is needed to remove all oxygen atoms from the triglyceride via hydrodeoxygenation. This also produces three Cis hydrocarbons. Conventionally, this route has often been preferred due to preserving larger carbon chains.

Mechanism 2: Decarbonylation. In this mechanism, three of the oxygens are removed as CO, while the remaining three oxygens are removed as $H_2O$. This also results in formation of $C_{17}$ hydrocarbons, due to the loss of carbon in the form of CO. Due to the combination of forming less water, and forming fewer C—H bonds, the total hydrogen needed for this removal mechanism is 10 $H_2$ per triglyceride.

Mechanism 3: Decarboxylation. In this mechanism, $CO_2$ is formed instead of CO. This further reduces the required hydrogen so that only 7 $H_2$ are needed per triglyceride.

Based on the above mechanisms and the corresponding hydrogen consumption, increasing the amount of decarboxylation can provide a corresponding reduction in hydrogen consumption. It is noted that these idealized mechanisms can also be used as a basis for determining the amount of hydrogen consumption during a deoxygenation reaction. For example, in a situation where substantially all of the bio-derived feedstock corresponds to triglycerides, rather than trying to determine the amount of $H_2$ remaining in the effluent from a reactor, the amount of $CO_2$ and CO can be characterized. The $H_2$ consumption can then be calculated based on the amount of $CO_2$ and CO formation relative to the original oxygen content of the feed (assuming substantially complete deoxygenation).

Isomerization Catalyst and Isomerization Conditions

In various aspects, an isomerization catalyst can be used that corresponds to a base metal isomerization catalyst that is also a zeolitic catalyst. An example is a zeolitic catalyst that includes Ni and/or Co as Group 8-10 metals, and Mo and/or W as a Group 6 metal. Further benefits can be achieved when such a catalyst corresponds to a catalyst that is formed by using a dispersion agent during addition of the metals to the isomerization catalyst.

In various aspects, an isomerization catalyst can include a zeolitic material, such as a zeolitie material that is bound with a refractory oxide binder. In this discussion, a zeolitic material is defined to refer to a crystalline material having a porous framework structure built from tetrahedra atoms connected by bridging oxygen atoms. Examples of known zeotype/zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, www.iza-structure.org/databases/. A zeolite corresponds to a zeolitic material that is an aluminosilicate. A zeolitic material more generally refers crystalline structures having a suitable framework structure that may contain oxides of Si, Al, and/or heteroatoms different from Si and Al. Such heteroatoms can include any heteroatom generally known to be suitable for inclusion in a zeolitic framework structure, such as gallium, boron, germanium, phosphorus, zinc, and/or other transition metals that can substitute for silicon and/or aluminum in a zeolitic framework structure.

In this discussion, reference is made to the ring size of the pore channels of a material having a zeolitic framework structure. One option for characterizing the ring size is based on the number of atoms in the ring structure that defines the largest pore channel in the zeolitic framework structure. For example, a material having a ZSM-48 framework type includes 10-member ring pore channels as the largest pore channels. The 10-member ring pore channels in a ZSM-48 framework structure correspond to 1-dimensional (or 1-D) pore channels.

Examples of suitable zeolitic materials include materials having a framework structure that corresponds to a 1-D 10-member ring molecular sieve. Examples of such framework structures include the framework structures corresponding to EU-1, ZSM-35 (or ferrierite), ZSM-11, ZSM-57, NU-87, SAPO-11, ZSM-48, ZSM-23, and ZSM-22. Preferred materials are EV-2, EU-11, ZBM-30, ZSM-48, or ZSM-23. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Optionally, the isomerization catalyst can include a binder for the molecular sieve, such as alumina, titania, silica, silica-alumina, zirconia, or a combination thereof, for example alumina and/or titania or silica and/or zirconia and/or titania.

More generally, any type of zeolitic framework structure that is known to provide isomerization activity can be used as part of a base metal isomerization catalyst that is formed using a dispersion aid. Other examples of zeolitic framework materials that can benefit from using a dispersion aid when depositing base metals include, but are not limited to, USY (FAU framework structure), ZSM-11, ZSM-12, and EMM-17. It is noted that some of these materials may also have activity for performing dewaxing via cracking, as opposed to via isomerization. However, such zeolitic materials can still achieve the benefit of improved activity and/or reduced selectivity for light ends formation relative to a base metal catalyst using the same zeolitic material when formed without a dispersion agent. Other examples of zeolitic materials that are not zeolites include molecular sieves corresponding to aluminophosphate (AlPO) type molecular sieves and silicoaluminophosphate (SAPO) molecular sieves (SAPO), such as SAPO-34 and SAPO-11.

It has been discovered that some framework structures not typically suitable for isomerization of mineral distillate feeds for fuel formation can be beneficial for isomerization of feeds containing a bio-derived feedstock. Some examples of such framework types include MTW and FAU, which have 12-member ring pore channels as the largest pore channel. Conventionally, such framework structures would be expected for use in hydrocracking of mineral distillate feeds. However, it has been unexpectedly discovered that such base metal isomerization/dewaxing catalysts formed using such framework structures can provide reduced hydrogen consumption when used for isomerization/dewaxing of bio-derived feedstocks having an oxygen content of 1.0 wt % or more.

It has also been discovered that catalysts including framework type MWW can be used for isomerization/dewaxing of bio-derived feedstocks containing 1.0 wt % or more of oxygen while reducing or minimizing hydrogen consumption. Conventionally, MWW framework types are not considered for dewaxing of mineral distillate feeds. However, it has been discovered that base metal MWW framework catalysts can be used for both oxygen removal and isomerization of oxygen-containing bio-derived feeds with reduced hydrogen consumption.

It has further been discovered that catalysts including the framework type corresponding to EMM-17 can be used for isomerization/dewaxing of bio-derived feedstocks containing 1.0 wt % or more of oxygen while reducing or minimizing hydrogen consumption.

It has yet further been discovered that catalysts including framework type FER (e.g., ZSM-35) can be used for isomerization/dewaxing of bio-derived feedstocks containing 1.0 wt % or more of oxygen while reducing or minimizing hydrogen consumption. It is noted that the largest pore channel size (largest sphere that can diffuse through a channel) for FER framework type is only 4.69 Angstroms. This is smaller than the typical pore channel size that would be desired for dewaxing of a mineral distillate feed. However, it has been discovered that base metal MWW framework catalysts can be used for both oxygen removal and isomerization of oxygen-containing bio-derived feeds with reduced hydrogen consumption.

Catalysts can be optionally bound with a binder or matrix material prior to use. Binders can be resistant to temperatures of the use desired and typically assist with attrition resistance. Binders may be catalytically active or inactive and can include other zeolites, other inorganic materials such as clays and metal oxides such as alumina, silica, and silica-alumina. Exemplary clays may include kaolin, bentonite, and/or montmorillonite and can often be commercially available. They may be blended with other materials such as silicates. Other binary porous matrix materials in addition to silica-aluminas can include materials such as silica-magnesia, silica-thoria, silica-zirconia, silica-beryllia, and/or silica-titania. Ternary materials such as silica-alumina-magnesia, silica-alumina-thoria, and/or silica-alumina-zirconia can also be suitable for use as binders. The matrix can be in the form of a co-gel. In some aspects, the base metal dewaxing catalysts can be formulated using a low surface area binder, herein representing a binder with a surface area of 150 m$^2$/g or less, or 130 m$^2$/g or less, or 100 m$^2$/g or less, or 80 m$^2$/g or less, or 70 m$^2$/g or less, such as down to 10 m$^2$/g or possibly still lower.

The amount of zeolite (or other zeolitic material) in a support including a binder can be from 20 wt % zeolitic material to 100 wt % zeolitic material, relative to the combined weight of binder and zeolite. For example, the amount of zeolite (or other zeolitic material) can be from 20 wt % to 100 wt %, or 20 wt % to 80 wt %, or 20 wt % to 50 wt %, or 30 wt % to 100 wt %, or 30 wt % to 80 wt %, or 30 wt % to 70 wt %, or 50 wt % to 100 wt %, or 50 wt % to 80 wt %. After combining a zeolitic material with any optional binder, the zeolitic material can be extruded to form support particles. Alternatively, support particles may be formed by any other convenient method. Optionally, after forming a zeolitic material and/or forming a support particle containing a zeolitic material, the zeolitic material and/or support particle can be steamed. This steaming is preferably performed prior to addition of catalytic metals. Steaming can be used to adjust the acidity of the zeolitic material and/or the support particle containing the zeolitic material.

An isomerization catalyst can also include catalytic metals supported on the zeolitic material and/or bound zeolitic material. Examples of catalytic metals include Ni, Co, Mo, and W. Examples of combinations of metals include NiW, NiMo, NiMoW, CoMo, and NiCoMo. When base metals (such as Ni, Co, Mo, and/or W) are used as the catalytic metals, the total weight of catalytic metals on an isomerization catalyst can range from 1.0 wt % to 30 wt %, or 1.0 wt % to 20 wt %, or 3.0 wt % to 30 wt %, or 3.0 wt % to 20 wt %, or 5.0 wt % to 30 wt %, or 5.0 wt % to 20 wt %, or 10 wt % to 30 wt %, relative to the weight of the isomerization catalyst. In some alternative aspects, an isomerization catalyst can include Pt, Pd, or a combination thereof in addition to and/or in place of base metals. In such aspects, the weight of the Pt, Pd, or a combination thereof can be 0.1 wt % to 1.5 wt % relative to the weight of the catalyst. However, it is noted that the presence of water and/or carbon oxides in the reaction environment may tend to deactivate noble metal isomerization catalysts. In other aspects, the isomerization catalyst can be substantially free of noble metals. In such aspects, the isomerization catalyst can be substantially free of Pt, Pd, Ru, Rh, Ir, and Os. Substantially free of Pt, Pd, Ru, Rh, Ir, and Os is defined as having a combined content of such metals of 0.05 wt % or less relative to a weight of the catalyst.

Impregnation, such as impregnation by incipient wetness or ion exchange in solution, is a commonly used technique for introducing metals into a catalyst composition that includes a support. During impregnation, a support can be exposed to a solution containing a salt of the metal for impregnation. There are many variables that can affect the dispersion of the metal salt during impregnation, including the concentration of the salt, the pH of the salt solution, and the point of zero charge of the support material, but not excluding other variables that may also be important during incipient wetness or ion exchange impregnation. Multiple exposure steps can optionally be performed to achieve a desired metals loading on a catalyst. After impregnating a support with a metal salt, the support can be dried to remove excess water. The drying can be performed under any convenient atmosphere, such as air, at an appropriate temperature, such as from 80° C. to 200° C.

In some aspects, the catalytic metals can be added to an isomerization catalyst in the presence of a dispersion agent. An isomerization catalyst formed using a dispersion agent can have a reduced or minimized instance of larger clusters of metal on the catalyst. This can be characterized, for example, based on stack height measurements.

Dispersion agents can correspond to organic oxygenates and/or organic compounds that have functional groups containing nitrogen that can serve as ligands for the metals during deposition (such as impregnation) of metals on the support material that contains the zeolitic framework structure. Citric acid is an example of a dispersion agent. More generally, dispersion agents can correspond to carboxylic acids and alcohols that include 5-15 carbon atoms in the compound, or 5-12 carbon atoms, or 5-8 carbon atoms. Still other examples of chelating agents for use for base metal dispersions include dialkanolamines, such as diethanolamine, dialkanoldiamines, or trialkanolamines, with triethanolamine (TEA), and amino alcohols. Optionally, the dispersion agent can comprise a ratio of carbon atoms to oxygen atoms in the dispersion agent of 0.6 to 2.0.

The amount of dispersion agent to use can be selected relative to the amount of Group 8-10 metal that is being deposited. For example, when the Group 8-10 metal is deposited by impregnation, the dispersion agent can be added to the impregnation solution. The molar amount of dispersion agent relative to the molar amount of Group 8-10 metal can be 0.5 to 5.0 (i.e., 0.5 moles dispersion agent per 1 mole Ni to 5.0 moles dispersion agent per 1 mole Ni), or 1.0 to 5.0, or 1.5 to 5.0, or 0.5 to 3.0, or 1.0 to 3.0. It is noted that in this discussion, references to Groups are references to the current version of the IUPAC Periodic Table.

After forming a catalyst composition with supported base metals, the base metals may be sulfided prior to use to form a sulfided base metal catalyst. The sulfidation of the metals can be performed by any convenient method, such as gas phase sulfidation and/or liquid phase sulfidation. Sulfidation can generally be carried out by contacting a catalyst including metal compounds with a sulfur containing compound, such as elemental sulfur, hydrogen sulfide, and/or a polysulfide. Hydrogen sulfide can be a convenient sulfidation agent for gas phase sulfidation and can be incorporated into a gas phase sulfidation atmosphere containing hydrogen in an amount of about 0.1 wt % to about 10 wt %. Sulfidation can additionally or alternatively be carried out in the liquid phase utilizing a combination of a polysulfide, such as a dimethyl disulfide-spiked hydrocarbon stream, and hydrogen. The sulfidation can be performed at a convenient sulfidation temperature, such as from 150° C. to 500° C. The sulfidation can be performed at a convenient sulfidation pressure, such as 100 psig (690 kPa-g) to 1000 psig (6900 kPa-g) or more. The sulfidation time can vary depending on the sulfidation conditions, such that sulfidation times of 1 hour to 72 hours can be suitable.

By using a dispersion agent, the nature of how metals are deposited is altered when depositing metals on the zeolitic catalyst. In particular, using a dispersion agent can increase the percentage of locations on a catalyst where the "stack height" or the number of monolayers of metal is limited to a single layer. In some aspects, the catalyst can have a higher number of locations with a single layer of metal than the number of locations having two layers of metal. In some aspects, the ratio of the number of locations with one layer of metal to the number of locations having two layers of metal can be 1.1 or more, or 1.2 or more, or 1.3 or more, or 1.5 or more, such as up to 2.5 or possibly still more. In some aspects, the catalyst can have a higher number of locations with a single layer metal than the number of locations having two or more layers of metal. Without being bound by any particular theory, it is believed that reducing the stack heights of metal layers results in higher surface area to volume ratios for the metals deposited on a catalyst. It is further believed that this increase in surface area to volume for the deposited metals allows for greater metal efficiency (activity per amount of metal).

The number of locations having a specified number of layers of metal can be determined based on transmission electron microscopy (TEM) analysis. In this discussion, stack heights were determined according to the following procedure. Catalysts were prepared for TEM analysis by crushing them into fines (<100 nm thick pieces) using an agate mortar and pestle. The fines were dusted onto standard, 200 mesh, holey-carbon-coated Cu grids. Each grid was examined in the bright field TEM imaging mode of a JEM 200F TEM/STEM operated at an accelerating voltage of 200 kV. Digital images of randomly-selected areas were collected using a Gatan OneView CCD camera and Digital Micrograph software. The images were analyzed by manually by counting the number of layers associated with more than 500 individual particles. The layer count data input into KaleidaGraph. KaleidaGraph software was used to generate a histogram (i.e., plot indicating the number of layers vs the number of particles of a given layer) and to calculate the mean and median number of layers per particle for a given material.

In some aspects, process conditions for isomerization can include a temperature of 200° C. to 450° C., or 270° C. to 400° C., or 315° C. to 400° C.; a hydrogen partial pressure of 1.2 MPag to 34.6 MPag (200 psig to 5000 psig), or 1.2 MPag to 20.8 MPag, or 4.8 MPag to 20.8 Mpag; and a hydrogen treat gas rate of 35.6 m$^3$/m$^3$ (200 SCF/B) to 1781 m$^3$/m$^3$ (10,000 scf/B), or 71 m$^3$/m$^3$ (400 SCF/B) to 2140 m$^3$/m$^3$ (12,000 scf/B), or 178 m$^3$/m$^3$ (1000 SCF/B) to about 890.6 m$^3$/m$^3$ (5000 SCF/B). The LHSV can be from 0.1 hr$^{-1}$ to 5.0 hr$^{-1}$, or from 0.5 hr$^{-1}$ to 5.0 hr$^{-1}$, or from 0.2 hr$^{-1}$ to 4.0 hr$^{-1}$, or from 1.0 hr$^{-1}$ to 4.0 hr$^{-1}$.

In some aspects, the deoxygenated effluent generated by the deoxygenation process can contain an organic oxygen content (i.e., excluding water and carbon oxides) of 1.0 wt % or more, or 2.0 wt % or more. In such aspects, additional deoxygenation can be performed while exposing the deoxygenated effluent to the isomerization catalyst to form an isomerized, deoxygenated effluent. In such aspects, the resulting isomerized, deoxygenated effluent can have an oxygen content of less than 1.0 wt %.

In some alternative aspects, it may be possible to use isomerization catalysts that are formed without using a dispersion agent and/or to use isomerization catalysts based on a noble metal such as Pt, Pd, or a combination thereof.

The isomerization process can improve one or more cold flow properties of a deoxygenated, isomerized fraction. In some aspects, the deoxygenated, isomerized fraction can have a pour point that is lower than the pour point of the deoxygenated fraction (prior to isomerization) by 10° C. or more, or 20° C. or more, or 30° C. or more, such as up to 60° C. or possibly still more. In aspects where the isomerization catalyst is used for isomerization of a feed that has not previously been deoxygenated, the isomerized fraction can have a pour point that is lower than the pour point of the deoxygenated fraction (prior to isomerization) by 10° C. or more, or 20° C. or more, or 30° C. or more, such as up to 60° C. or possibly still more.

Selective Decarboxylation—Catalyst and Conditions

It has been discovered that bulk multimetallic catalysts including both a Group 6 metal and a Group 8-10 metal can have increased selectivity for performing deoxygenation via decarboxylation, and therefore can provide reduced or minimized hydrogen consumption. In some aspects, the bulk multimetallic catalysts can correspond to bulk multimetallic catalysts that are formed by heating a mixture containing the Group 6 metal(s), the Group 8-10 metal(s), a first organic compound containing at least one amine group, and a second organic compound including at least one carboxylic acid group to form a catalyst precursor. For example, the mixture can be heated to a temperature of 195° C. to 250° C. for a reaction time to form a catalyst precursor including the Group 6 metal(s), the Group 8-10 metal(s), and a reaction product of the first organic compound and the second organic compound that contains an amide moiety and/or unsaturated carbon atoms not present in either the first organic compound or second organic compound. U.S. Pat. No. 8,722,563 provides examples of making such bulk multimetallic catalyst precursors and corresponding sulfide catalysts.

During deoxygenation, the bulk multimetallic catalyst can be exposed to the feed containing the bio-derived feedstock under deoxygenation conditions. In some aspects, the deoxygenation conditions can include a pressure 200 psig (1.4 MPag) to 2000 psig (13.8 MPag), or 400 psig (2.8 MPag) to 2000 psig (13.8 MPag), or 200 psig (1.4 MPag) to 1000 psig (6.9 MPag), or 400 psig (2.8 MPag) to 1000 psig (6.9 MPag), or 200 psig (1.4 MPag) to 600 psig (4.1 MPag), or 400 psig (2.8 MPag) to 800 psig (5.5 MPag). It is noted that higher partial pressures of hydrogen can be beneficial for maintaining catalyst activity over longer run lengths, but may also mitigate some of the benefit for reduced hydrogen consumption. Other deoxygenation conditions can include a temperature of 204° C. to 399° C., or 204° C. to 350° C., or 230° C. to 399° C., or 230° C. to 350° C., or 204° C. to 260° C.; a liquid hourly space velocity (LHSV) of 0.1 $hr^{-1}$ to 10 $hr^{-1}$, or 0.1 $hr^{-1}$ to 10 $hr^{-1}$; and/or a hydrogen treat gas rate of 500 scf/B (84 $Nm^3/m^3$) to 10,000 scf/B (1685 $Nm^3/m^3$). One option for selecting a treat gas rate can be to select a rate based on the expected stoichiometric amount of hydrogen for complete deoxygenation of the feedstock. For example, many types of biocomponent feeds have a stoichiometric hydrogen need for deoxygenation of between 200 scf/B (34 $Nm^3/m^3$) to 1500 scf/B (253 $Nm^3/m^3$), depending on the mechanism for oxygen removal. The hydrogen treat gas rate can be selected based on a multiple of the stoichiometric hydrogen need, such as at least 1.0 times the hydrogen need, or at least 1.5 times the hydrogen need, or at least 2.0 times the hydrogen need, or at least 4.0 times the hydrogen need, such as up to 8.0 times or up to 10 times or possibly more.

In some aspects, the deoxygenation conditions can be suitable for reducing the organic oxygen content of the feed (i.e., excluding water and carbon oxides) to less than about 1.0 wt %, such as less than about 0.5 wt % or less than about 0.2 wt %. Alternatively, in some aspects the effective conditions can be selected to perform at least a partial deoxygenation of the feedstock. A partial deoxygenation corresponds to conditions suitable for reducing the oxygen content of the feed by 50% to 95%, or 70 to 95%, or 85 to 95%. During partial deoxygenation, the amount of organic oxygen remaining in the partially deoxygenated effluent can correspond to an oxygen content of 1.0 wt % or more, or 2.0 wt % or more, such as up to 5.0 wt %. In some aspects involving partial deoxygenation, the weight ratio of organic oxygen in the deoxygenated effluent to organic oxygen in the feed to the deoxygenation catalyst can be 0.01 to 0.1, or 0.02 to 0.1, or 0.01 to 0.05.

It is noted that if partial deoxygenation or no deoxygenation is performed prior to exposing a feed to an isomerization catalyst, the feed exposed to the isomerization catalyst may still contain an organic oxygen content of 1.0 wt % or more, or 2.0 wt % or more, or 4.0 wt % or more, such as up to 12 wt % or possibly still higher. In such aspects where substantial organic oxygen is in the feed exposed to an isomerization catalyst, the weight ratio of organic oxygen in the isomerized effluent to organic oxygen in the feed to the isomerized catalyst can be 0.5 or less, or 0.1 or less, or 0.05 or less, such as down to 0.005 or possibly still lower. It is noted that the "feed" to the isomerization catalyst may correspond to a (partially) deoxygenated effluent from deoxygenation and/or hydrotreatment of an initial feed.

Single Stage Deoxygenation and Isomerization

In some aspects, the increased activity of a bulk multimetallic deoxygenation catalyst, in combination with reduced heat release during deoxygenation, can allow for incorporation of an isomerization catalyst within the same reactor/reaction stage as the deoxygenation catalyst. In other words, at least a portion of the deoxygenated effluent generated by deoxygenation can be exposed to an isomerization catalyst without performing an intermediate separation.

In aspects where an isomerization catalyst is included in the same stage as the deoxygenation catalyst, it can be beneficial to use an isomerization catalyst that is tolerant of the reaction environment created by a deoxygenation effluent. For example, deoxygenation typically results in formation of water, which can rapidly deactivate some types of isomerization catalysts. Deoxygenation also typically results in formation of some CO, which can also deactivate some types of isomerization catalysts.

In some aspects, the difficulties associated with performing isomerization on a deoxygenated effluent without performing a prior separation can be at least partially mitigated by using a base metal isomerization catalyst, such as a zeolitic catalyst that includes Ni and/or Co as Group 8-10 metals, and Mo and/or W as a Group 6 metal. Further benefits can be achieved when such a catalyst corresponds to a catalyst that is formed by using a dispersion agent during addition of the metals to the isomerization catalyst.

CONFIGURATION EXAMPLES

A bulk multimetallic base metal catalyst and/or a bulk metal isomerization catalyst can be used in a variety of configurations for processing of bio-derived feedstocks (and/or feed containing at least a portion of a bio-derived feedstock).

FIG. 1 shows an example of a configuration for performing deoxygenation of a feed that includes at least a portion of a bio-derived feedstock. In the example shown in FIG. 1, the improved activity of the bulk metal hydrotreating catalyst is used to allow sufficient hydrotreating catalyst to be placed in a single reactor/reaction stage for deoxygenation of a feed.

In FIG. 1, a feed 105 including at least a portion of a bio-derived feedstock is passed into an initial reactor (or initial reaction stage) 120. The feed 105 is exposed to catalyst in initial reactor 120 in the presence of a stream of a hydrogen-containing gas. The hydrogen-containing gas can include fresh hydrogen 101, recycled hydrogen 111, or a combination thereof. In FIG. 1, the catalyst in initial reactor 120 includes a supported base metal catalyst 122 and a bulk multimetallic base metal catalyst 128. In the example configuration shown in FIG. 1, use of the bulk multimetallic base metal catalyst as part of the catalyst within the reactor allows initial reactor 120 to have sufficient catalyst activity for performing substantially complete deoxygenation of the feed 105.

After performing deoxygenation in initial reactor 120, in FIG. 1, the resulting deoxygenated effluent 125 is passed into stripper 130 to remove light gases from the deoxygenated effluent 125, such as any carbon oxides, $H_2S$, and/or $NH_3$. This can also remove any remaining $H_2$, which can optionally be used as part of recycled hydrogen 111. Water can also be removed in the stripping stage. The output from the stripper can then optionally be exposed to any additional hydroprocessing 140 that is desired. Additional fresh hydrogen 102 can be provided to additional hydroprocessing stage or reactor 140. After any additional optional hydroprocessing, a fractionator 150 can be used to separate out product fractions. In the example shown in FIG. 1, the fractionator 150 is used to separate out naphtha fraction 152, jet fraction 154, and diesel fraction 156.

It is noted that the configuration shown in FIG. 1 (and/or other configurations) can also optionally include one or more types of recycle streams. Recycle streams can be beneficial for various purposes. For example, in a reactor such as initial reactor 120, a recycle stream based on a deoxygenated effluent can be beneficial for reducing the rate of heat generation within the reactor volume. This is because the recycle stream is already substantially deoxygenated. By combining a recycle stream with a fresh bio-derived feed, the recycle stream can reduce the concentration of oxygen in the total feed to the initial reactor, thus reducing the rate of heat release during the deoxygenation process. As another example, after product fractionation, recycling a portion of the bottoms can be beneficial for allowing any unconverted/non-isomerized product to be exposed to the isomerization catalyst a second time. This can improve cold flow properties and/or improve yield, depending on the configuration. In the configuration example shown in FIG. 1, two examples of recycle streams are shown. One recycle stream is recycle stream 173. Recycle stream 173 corresponds to recycling a portion of the effluent from stripper 130 back to the reactor 120. Another recycle stream is recycle stream 177. Recycle stream 177 corresponds to recycling a portion of the bottoms product from the fractionator back to the initial reactor 120. Both recycle stream 173 and recycle stream 177 can assist with controlling temperature in reactor 120 and/or can assist with further improving cold flow properties of the resulting final products.

Figure 2:
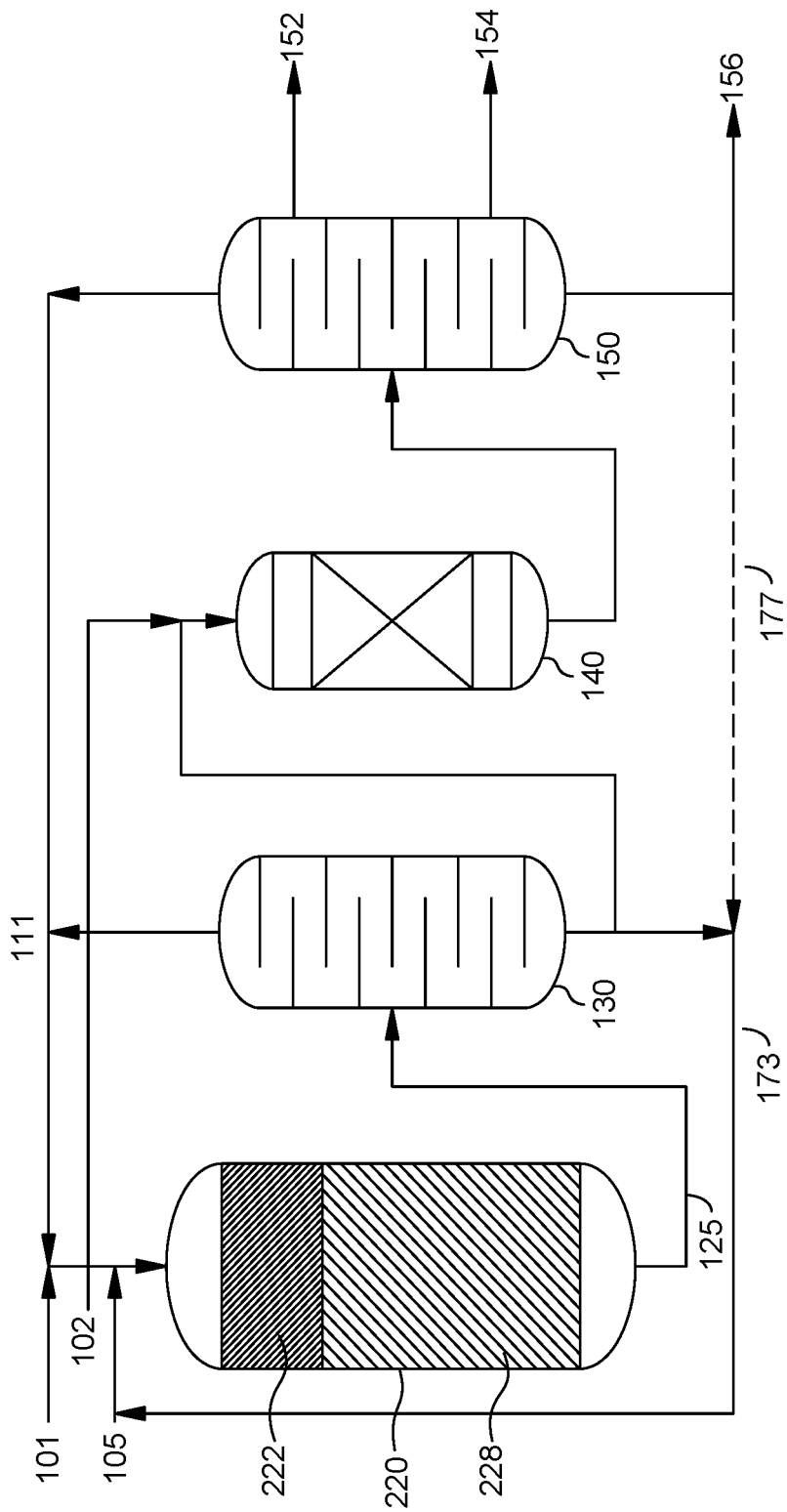
FIG. 2 shows an example of a configuration for using a bulk multimetallic base metal catalyst and an isomerization catalyst in a reactor or reaction stage for processing of a feed containing a bio-derived component.

FIG. 2 shows another example of a configuration. The configuration in FIG. 2 is similar, but with a different set of catalysts in the initial reactor 220. In the configuration in FIG. 2, initial reactor 220 includes bulk multimetallic base metal catalyst 222 and base metal isomerization catalyst 228. By using a bulk multimetallic base metal catalyst 222, sufficient deoxygenation of the feed 105 can be performed in a smaller volume. This allows the remaining volume to be used for base metal isomerization catalyst 228. Additionally or alternately, a portion of the oxygen removal can be performed by base metal isomerization catalyst 228.

Figure 3:
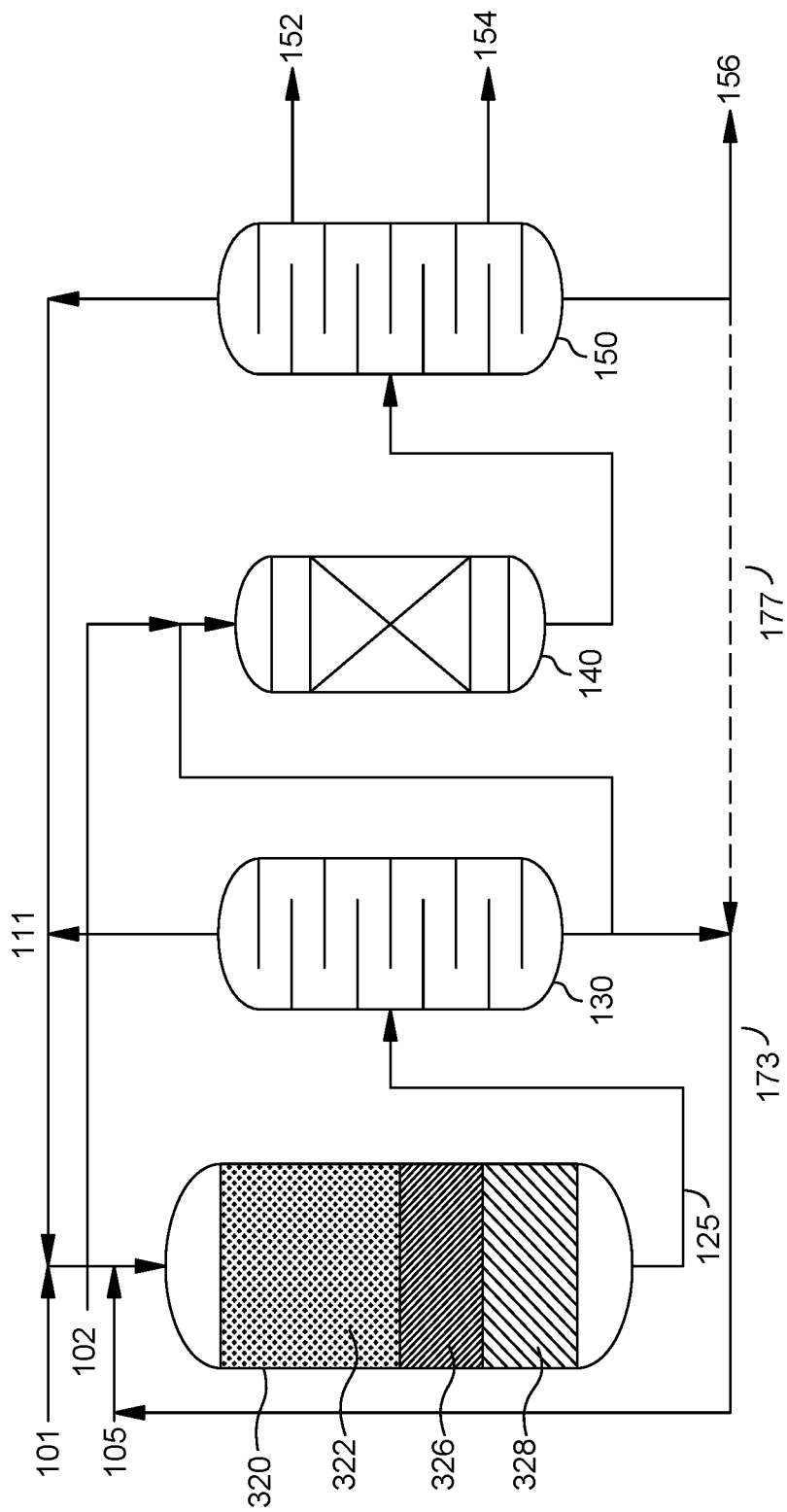
FIG. 3 shows an example of a configuration for using a supported catalyst, a bulk multimetallic base metal catalyst, and an isomerization catalyst in a reactor or reaction stage for processing of a feed containing a bio-derived component.

Still another configuration option is shown in FIG. 3. In FIG. 3, initial reactor 320 includes a supported base metal catalyst 322, a bulk multimetallic base metal catalyst 326, and base metal isomerization catalyst 328. Similar to FIG. 2, the addition of the bulk base metal multimetallic catalyst 326 to initial reactor 320 reduces the volume of hydrotreating catalyst that is needed, so that volume is available for base metal isomerization catalyst 328.

Figure 4:
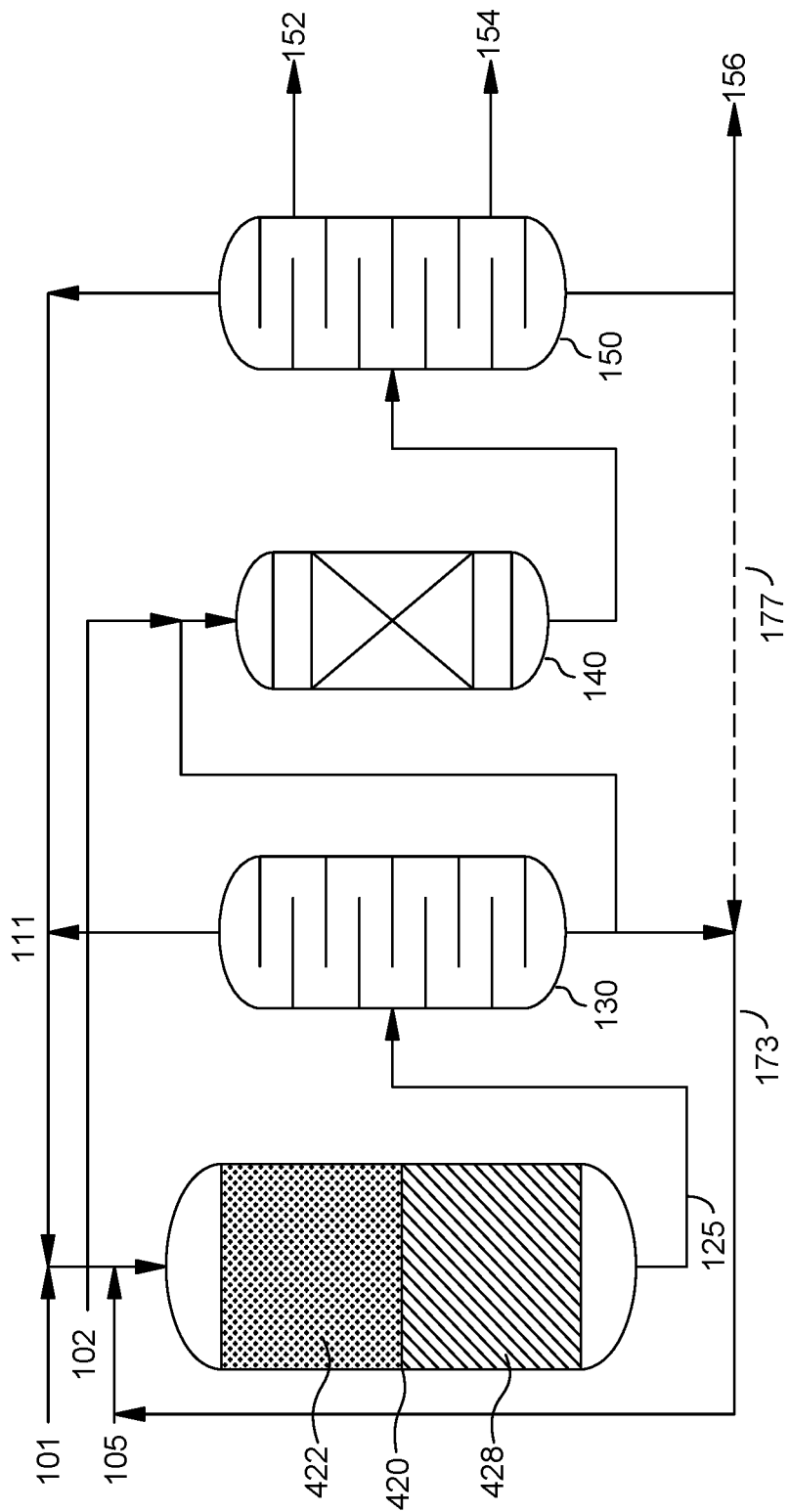
FIG. 4 shows an example of a configuration for using a supported catalyst and a base metal isomerization catalyst in a reactor or reaction stage for processing of a feed containing a bio-derived component.

Yet another configuration option is shown in FIG. 4. In FIG. 4, initial reactor 420 includes a supported base metal catalyst 422 and a base metal isomerization catalyst 428. In the configuration shown in FIG. 4, the base metal isomerization catalyst 428 can perform a portion of the deoxygenation of the feed. This can reduce the amount of supported base metal catalyst 422 that is needed, thus making volume available in reactor 420 for the isomerization catalyst 428.

Figure 5:
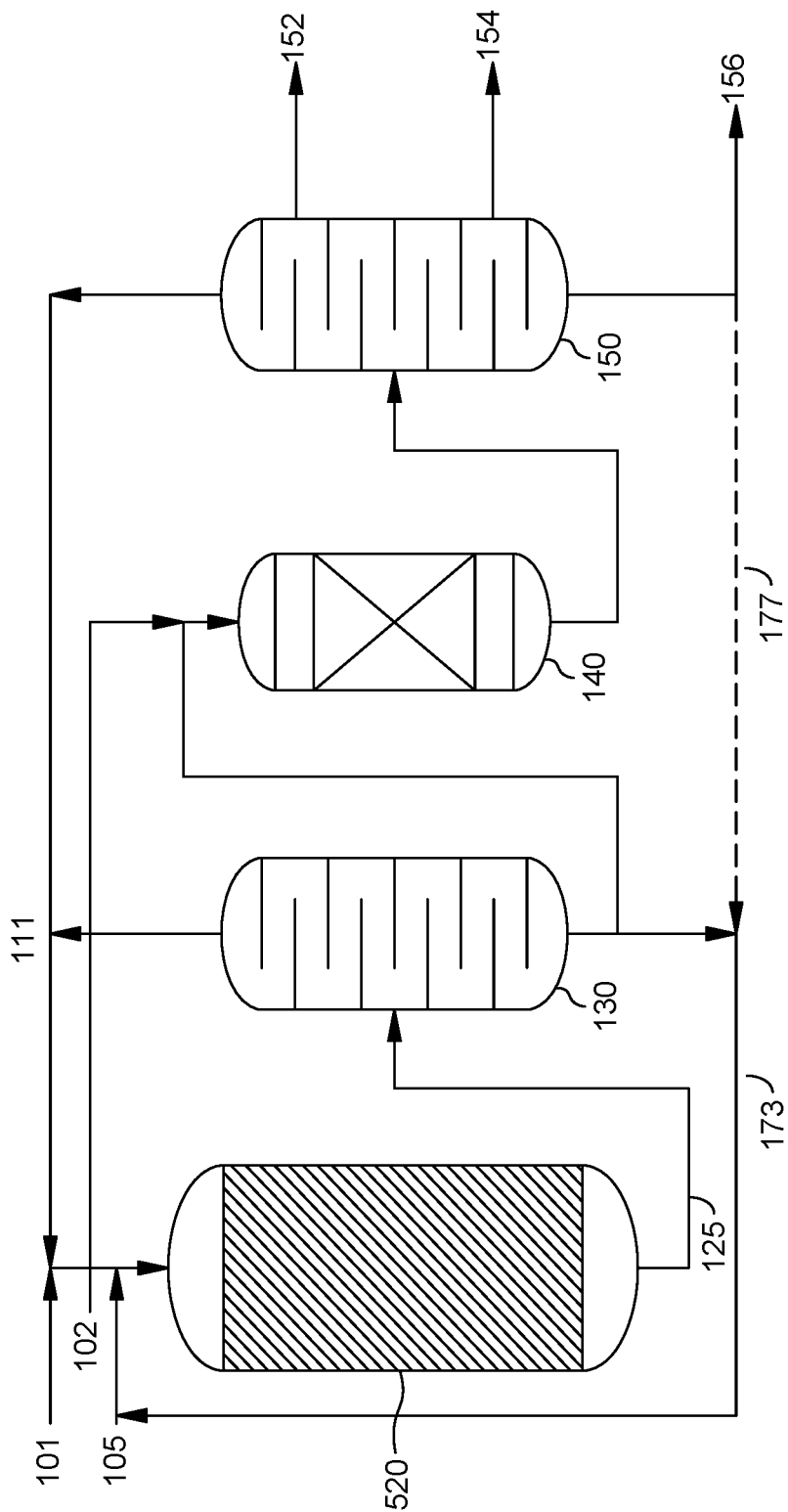
FIG. 5 shows an example of a configuration for using a base metal isomerization catalyst in a reactor or reaction stage for processing of a feed containing a bio-derived component.

FIG. 5 shows still another configuration option. In FIG. 5, all of the catalyst in reactor 520 corresponds to a base metal isomerization catalyst. This type of configuration allows the base metal isomerization catalyst to perform all of the deoxygenation while also performing isomerization.

It is noted that FIG. 1 to FIG. 5 each show a two stage hydroprocessing stages, where the output from the initial hydroprocessing stage is stripped and then passed into a second hydroprocessing stage. It is noted that any of the initial hydroprocessing stage configurations shown in FIG. 1 to FIG. 5 can be used in a single stage configuration. Such a single stage configuration can be beneficial, for example, in situations where a lower amount of conversion is desired during isomerization. Such lower conversion via isomerization could be used, for example, to generate a higher volume of diesel while still generating some jet boiling range components.

Figure 7:
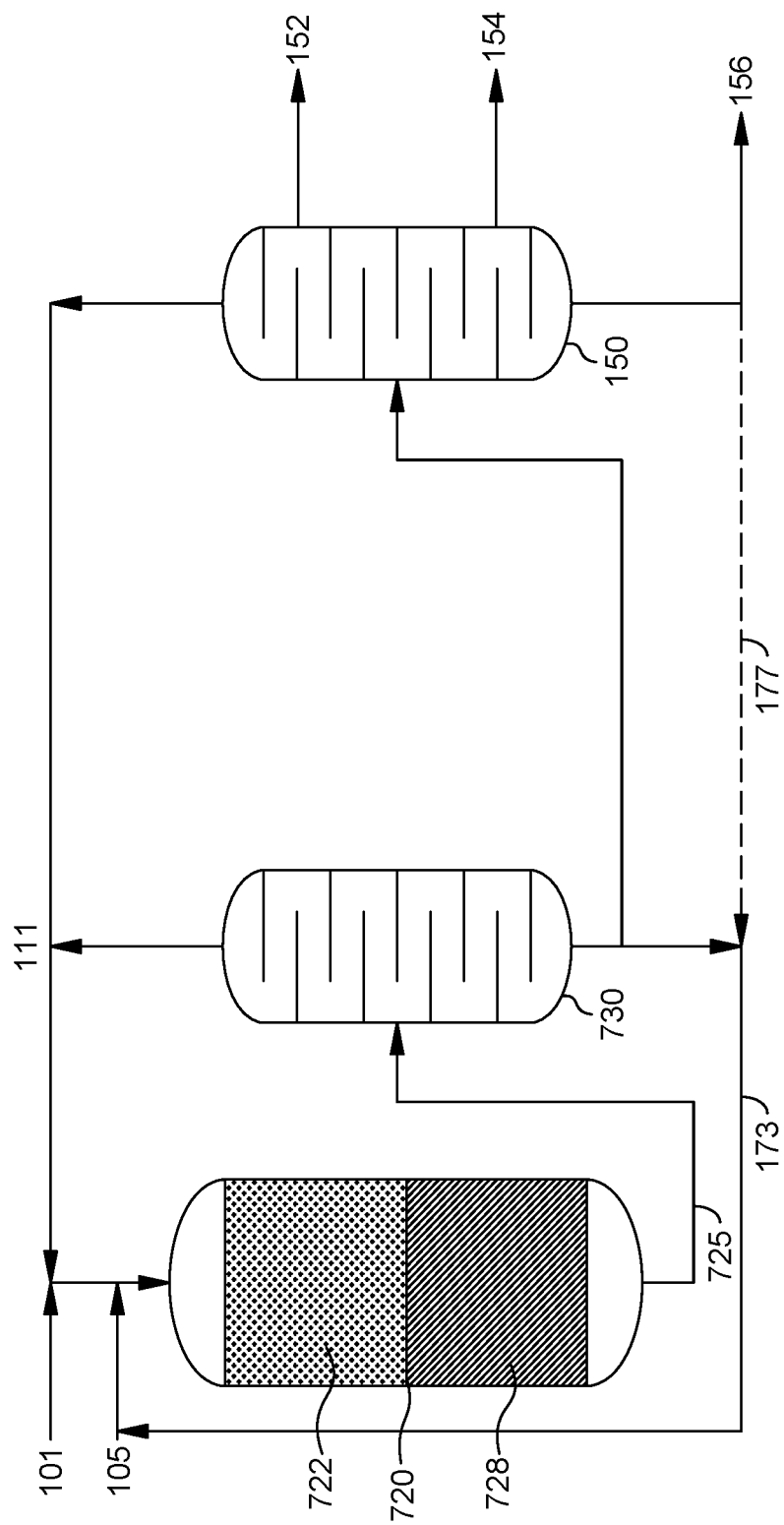
FIG. 7 shows an example of a single stage configuration for processing of a feed containing a bio-derived component.

FIG. 7 shows an example of a single stage configuration. In FIG. 7, hydroprocessing stage 720 is the only hydroprocessing stage prior to fractionator 150. Stripping stage 130 is optional. In configurations where stripper 130 is not included, deoxygenated/isomerized effluent 125 can be passed directly into fractionator 150. In the configuration shown in FIG. 7, hydroprocessing stage 720 includes at least one bed of deoxygenation catalyst 722 and at least one bed of isomerization catalyst 728, but any other convenient combination of deoxygenation and/or isomerization catalysts can be used.

Example 1—Deoxygenation

A series of hydrotreating catalysts were tested to determine hydrogen consumption per oxygen removed with feeds containing bio-derived feedstocks. To perform the tests, a model feed was used. For the results shown in the following examples, the model feed corresponded to 50 vol % soybean oil and 50 vol % n-octadecane (n-$C_{18}$). Since the glyceride chains in soybean oil typically correspond to $C_{18}$ chains, the model feed is believed to represent a situation where fresh feed is blended with deoxygenated product in a roughly 1:1 volume ratio. It is noted that additional experimental runs were also performed at a volume ratio of soybean oil to n-octadecane of 1:2, with qualitatively similar results.

Table 1 shows a listing of the catalysts that were tested for hydrogen consumption during deoxygenation. It is noted that Catalysts I-L and N-Q correspond to catalyst systems, with the weight ratio of the catalysts indicated in the catalyst description. Table 1 also shows the mass and volume used for each catalyst. To facilitate comparison, the total volume of each catalyst/catalyst system shown in in Table 1 is 2.1 $cm^3$.

TABLE 1

Catalysts for Deoxygenation

| Catalyst | Catalyst Description | Cat1 Mass [g] | Cat1 Volume [cc] | Cat2 Mass [g] | Cat2 Volume [cc] |
| --- | --- | --- | --- | --- | --- |
| A | NiMo on $Al_2O_3$ | 2.121 | 2.1 | — | — |
| B | Ni promoted Mo on $Al_2O_3$ | 1.323 | 2.1 | — | — |
| C | NiMo on $Al_2O_3$ | 1.470 | 2.1 | — | — |
| D | Bulk NiW | 3.381 | 2.1 | — | — |
| E | NiMo on oxide support | 2.457 | 2.1 | — | — |
| F | CoMo on $Al_2O_3$ | 1.772 | 2.1 | — | — |
| G | Regenerated Catalyst E | 1.910 | 2.1 | — | — |
| H | $2^{nd}$ instance of Catalyst A | 2.121 | 2.1 | — | — |
| I | 75/25 Catalyst A/Catalyst F | 1.596 | 1.58 | 0.437 | 0.52 |
| J | 75/25 Catalyst B/Catalyst C | 0.995 | 1.58 | 0.364 | 0.52 |
| K | 75/25 Catalyst B/Catalyst A | 0.995 | 1.58 | 0.525 | 0.52 |
| L | 25/75 Catalyst B/Catalyst C | 0.328 | 0.52 | 1.106 | 1.58 |
| M | Mo on $Al_2O_3$ | 1.218 | 2.1 | — | — |
| N | 75/25 Catalyst D/Catalyst F | 2.544 | 1.58 | 0.439 | 0.52 |
| P | 75/25 Catalyst M/Catalyst A | 0.916 | 1.58 | 0.525 | 0.52 |
| Q | 25/75 Catalyst B/Catalyst F | 0.328 | 0.52 | 1.334 | 1.58 |

During testing, an additional catalyst for diolefin saturation was also included upstream from the catalysts shown in Table 1. The diolefin saturation catalyst was exposed to the feed at a low temperature prior to the deoxygenation.

Table 2 shows the conditions for processing the model feed over the various hydrotreating catalysts. In Table 2, "DMDS" refers to dimethyl disulfide, which was used as the sulfur spiking agent to achieve the spiked sulfur content shown in Table 2.

TABLE 2

Reactor Conditions for Deoxygenation

| | Reactor Condition | | | | | |
|---|---|---|---|---|---|---|
| | 1 | 2 | 3 | 4 | 5 | 6 |
| Reactor Temp [° C.] | 316 | 321 | 327 | 310 | 310 | 310 |
| Pressure [MPa-g] | 2.8 | 2.8 | 2.8 | 2.8 | 2.8 | 2.8 |
| Feedstock Description | 1:1 soybean/ nC18 + DMDS | 1:1 soybean/ nC18 + DMDS | 1:1 soybean/ nC18 + DMDS | 1:1 soybean/ nC18 + DMDS | 1:1 soybean/ nC18 + DMDS | 1:1 soybean/ nC18 + DMDS |
| Spiked Sulfur [ppm] | 135 | 135 | 135 | 135 | 478 | 478 |
| LHSV [1/h] | 1 | 1 | 1 | 1 | 1 | 0.5 |
| $H_2$ Treat Gas Rate [SCF/bbl] | 8000 | 8000 | 8000 | 8000 | 8000 | 8000 |

Reactor conditions 4, 5, and 6 from Table 2, corresponding to a temperature of 310° C. (590° F.), were used to process the model feed over various catalysts from Table 1. Table 3 shows yields of CO, $CO_2$, and $H_2O$ from the hydodeoxygenation, as well as the $H_2$ consumption. It is noted that the $H_2O$ yield represents the water in the total liquid product. Any gas phase water was not characterized. However, it is expected that the gas phase water would be proportional to the water in the total liquid product. The Ha consumption in Table 3 is reported in two ways. The first column shows grams of $H_2$ consumed per mole of O removed. The second column normalizes this ratio relative to the value for Catalyst C.

As shown in Table 3, the bulk NiW catalyst (Catalyst D) provided the lowest $H_2$ consumption per oxygen removed. It is believed that this unexpectedly low $H_2$ consumption is due to formation of $CO_2$ via decarboxylation during oxygen removal, as indicated by the increased $CO_2$ production for Catalyst D. At each of the conditions tested, the hydrogen consumption is less than 75% of the value for the reference supported NiMo catalyst. Thus, changing the sulfur content of the feed and/or the space velocity did not qualitatively change the hydrogen consumption benefit of using a bulk metal catalyst for deoxygenation. This benefit of reduced hydrogen consumption is at least partially retained for Catalyst N, which corresponds to a stacked bed of the bulk NiW catalyst with a supported CoMo. By contrast, all of the

TABLE 3

Results from Deoxygenation at 310° C.

| Catalyst | Reaction Condition | CO yield (wt %) | CO2 yield (wt %) | H2O yield* (wt %) | $H_2$ consumed/ O removed (g $H_2$/ mol O) | $H_2$ consumption/ O removed Relative to Catalyst C |
|---|---|---|---|---|---|---|
| N (75/25 Cat D/ Cat F) | 4 | 0.24 | 2.8 | 2.61 | 4.1 | 80% |
| D (Bulk NiW) | 4 | 0.21 | 2.89 | 1.6 | 3.7 | 73% |
| M (Mo/$Al_2O_3$) | 4 | 0.04 | 0.07 | 2.42 | 5.3 | 105% |
| B (Ni promoted Mo on $Al_2O_3$) | 4 | 0.07 | 0.49 | 2.94 | 5.0 | 99% |
| C (NiMo on $Al_2O_3$) | 4 | 0.07 | 0.53 | 3.55 | 5.1 | 100% |
| F (CoMo on $Al_2O_3$) | 4 | 0.05 | 0.38 | 1.51 | 4.9 | 97% |
| A (NiMo on $Al_2O_3$) | 4 | 0.11 | 1.15 | | | |
| N (75/25 Cat D/ Cat F) | 6 | 0.28 | 1.89 | 2.51 | 4.3 | 85% |
| D (Bulk NiW) | 6 | 0.19 | 1.88 | 0.94 | 3.7 | 72% |
| M (Mo/$Al_2O_3$) | 6 | 0.06 | 0.05 | 3.93 | 5.4 | 105% |
| B (Ni promoted Mo on $Al_2O_3$) | 6 | 0.08 | 0.26 | 2.89 | 5.2 | 102% |
| C (NiMo on $Al_2O_3$) | 6 | 0.1 | 0.37 | 2.47 | 5.1 | 100% |
| F (CoMo on $Al_2O_3$) | 6 | 0.09 | 0.38 | 2.83 | 5.1 | 100% |
| A (NiMo on $Al_2O_3$) | 6 | 0.13 | 0.93 | 2.38 | 4.7 | 92% |
| N (75/25 Cat D/ Cat F) | 5 | 0.24 | 2.72 | 2.51 | 4.0 | 81% |
| D (Bulk NiW) | 5 | 0.17 | 2.62 | 1.22 | 3.6 | 72% |
| M (Mo/$Al_2O_3$) | 5 | 0.07 | 0.07 | 1.84 | 5.3 | 107% |
| B (Ni promoted Mo on $Al_2O_3$) | 5 | 0.07 | 0.48 | 2.68 | 5.0 | 101% |
| C (NiMo on $Al_2O_3$) | 5 | 0.09 | 0.66 | 3.15 | 5.0 | 100% |
| F (CoMo on $Al_2O_3$) | 5 | 0.07 | 0.38 | 1.05 | 4.8 | 96% |
| A (NiMo on $Al_2O_3$) | 5 | 0.15 | 1.27 | 3.04 | 4.7 | 94% | supported catalysts in Table 2 (Catalysts A, B, C, F, and M) have hydrogen consumption values that are similar.

The reduction in hydrogen consumed per mole of oxygen removed is retained as the reaction temperature increases. Table 4 shows results from deoxygenation at a temperature of 316° C., while Table 5 shows results at 321° C.

TABLE 4

Deoxygenation at 316° C.

| Catalyst | Reaction Condition | CO yield (wt %) | CO2 yield (wt %) | H2O yield* (wt %) | $H_2$ consumed/ O removed (g $H_2$/ mol O) | $H_2$ consumption/ O removed Relative to Catalyst C |
|---|---|---|---|---|---|---|
| N (75/25 Cat D/ Cat F) | 1 | 0.15 | 2.37 | 1.88 | 3.9 | 79% |
| D (Bulk NiW) | 1 | 0.12 | 2.65 | 1.21 | 3.5 | 70% |
| M (Mo/$Al_2O_3$) | 1 | 0.08 | 0.66 | 3.38 | 5.0 | 100% |
| B (Ni promoted Mo on $Al_2O_3$) | 1 | 0.06 | 0.49 | | | |
| C (NiMo on $Al_2O_3$) | 1 | 0.08 | 1.01 | 3.11 | 4.8 | 96% |
| F (CoMo on $Al_2O_3$) | 1 | 0.07 | 0.72 | 3.04 | 4.9 | 99% |
| A (NiMo on $Al_2O_3$) | 1 | 0.08 | 1.21 | | | |

As shown in Table 4, the advantage of reduced hydrogen consumption for the bulk metal catalyst is retained as the reaction temperature is increased to 316° C. (600° F.).

TABLE 5

Deoxygenation at 321° C.

| Catalyst | Reaction Condition | CO yield (wt %) | CO2 yield (wt %) | H2O yield* (wt %) | $H_2$ consumed/ O removed (g $H_2$/ mol O) | $H_2$ consumption/ O removed Relative to Catalyst C |
|---|---|---|---|---|---|---|
| N (75/25 Cat D/ Cat F) | 2 | 0.12 | 1.05 | 1.88 | 4.5 | 96% |
| D (Bulk NiW) | 2 | 0.16 | 2.16 | 1.18 | 3.7 | 78% |
| M (Mo/$Al_2O_3$) | 2 | 0.15 | 1.38 | 3.46 | 4.7 | 100% |
| B (Ni promoted Mo on $Al_2O_3$) | 2 | 0.08 | 0.47 | 3.04 | 5.1 | 108% |
| C (NiMo on $Al_2O_3$) | 2 | 0.13 | 1.41 | 3.15 | 4.6 | 99% |
| F (CoMo on $Al_2O_3$) | 2 | 0.09 | 0.7 | 2.93 | 4.9 | 105% |
| A (NiMo on $Al_2O_3$) | 2 | 0.11 | 1.13 | 3.3 | 4.8 | 102% |

As shown in Table 5, the bulk metal catalyst retains an advantage for reducing hydrogen consumption at 321° C. However, due to increased hydrogen consumption for the supported CoMo catalyst, the hydrogen consumption advantage is reduced or minimized for Catalyst N.

Example 2—Deoxygenation By Zeolitic Isomerization/Dewaxing Catalyst

Zeolitic isomerization/dewaxing catalysts with supported hydrogenation metals can also perform deoxygenation with reduced hydrogen consumption. To illustrate this, the model feed was hydroprocessed in the following manner. A reactor was loaded with two types of different supported NiMo hydrotreating catalysts, followed by one of the isomerization catalysts (or catalyst systems) shown in Table 6. During hydroprocessing, the temperature for the hydrotreating catalyst was maintained at less than 392° F.)(200° C. so that little or no deoxygenation was performed prior to exposing the feed to the dewaxing catalyst.

For the catalysts shown in Table 6, NiMo* or NiW* indicates that the hydrogenation metals were added to the catalyst using citric acid as a dispersion aid. For comparison, a run was also performed with silicon carbide in the location for the dewaxing catalyst. For the $H_2$ consumption, a reference system of two hydrotreating catalysts at 304° C. was selected. It is noted that for the catalysts in the first two rows of Table 6, the same number of moles of metal were used on both catalysts, to facilitate comparison between the NiW and NiMo catalysts. Similarly, for the catalysts in the final three rows of Table 6, the moles of NiW on each catalyst were the same as the moles of NiW or NiMo in the first two rows, in order to facilitate comparison.

TABLE 6

Isomerization Catalysts

| Catalyst | Isomerization reactor temperature (° C.) | CO yield (wt %) | CO2 yield (wt %) | H2O yield* (wt %) | H$_2$ consumed/ O removed (g H$_2$/ mol O)‡ | H$_2$ consumption/ O removed Relative to HDT catalyst stack at 304° C. |
|---|---|---|---|---|---|---|
| NiW/alumina-bound ZSM-48 | 354 | 0.11 | 3.53 | 3.42 | 4.0 | 83% |
| NiMo*/alumina-bound ZSM-48 (NiMo with the same moles of metals as NiW/alumina-bound ZSM-48) | 354 | 0.25 | 3.80 | 2.46 | 3.8 | 77% |
| 50/50 stack of i) NiW*/alumina-bound ZSM-11 and ii) NiW/alumina-bound ZSM-48 | 354 | 0.11 | 4.95 | 1.72 | 3.3 | 68% |
| NiW*/ZSM-48 bound with MCM-49 and Alumina | 354 | 0.10 | 5.10 | 2.31 | 3.5 | 71% |
| SiC | 354 | 0.03 | 0.07 | 1.13 | 5.3 | 108% |
| NiW*/alumina-bound ZSM-12 | 354 | 0.13 | 5.19 | 2.20 | 3.4 | 70% |
| NiW*/silica-bound EMM-17 | 354 | 0.03 | 4.88 | 3.10 | 3.7 | 76% |
| NiW*/alumina-bound ZSM-11 | 354 | 0.11 | 5.39 | 2.46 | 3.5 | 71% |

As shown in Table 6, all of the dewaxing catalysts performed deoxygenation with substantially lower hydrogen consumption than the comparative hydrotreating catalyst. Similar to the bulk metal hydrotreating catalysts, the lower hydrogen consumption was accompanied by increased $CO_2$ production during deoxygenation. While some hydrogen reduction benefit was achieved by using the NiW alumina-bound catalyst made without a dispersion agent, all of the catalysts that were made using the dispersion agent provided unexpectedly superior results with regard to further reducing the hydrogen consumed during deoxygenation.

The following are examples of the procedures used to form the catalysts shown in Table 8 and in the additional examples below:

Preparation of NiW/ZSM-48/Al$_2$O$_3$ catalyst: Extrudates of ZSM-48/Al$_2$O$_3$ were used as support for NiW depositions. The base metal solution absorption capacity of the extrudates was estimated using deionized water. The Ni and W precursor compounds in the catalyst preparations were nickel carbonate hydroxide tetrahydrate and ammonium metatungstate hydrate. The dispersion aide used in the metal solution impregnations was citric acid. To avoid damaging the extrudates during impregnation, the extrudates were humidified with air bubbling through a water bath at room temperature for 16 hours. As an example of sample preparation, 4.82 g of citric acid was dissolved in di-H$_2$O. 1.47 g of nickel carbonate hydroxide tetrahydrate was slowly added into citric acid solution. The molar ratio of citric acid/Ni is 2. $CO_2$ bubbles came out upon addition of nickel carbonate hydroxide. 5.10 g of ammonium metatungstate hydrate was added to the mixture solution. The total solution volume adjusted with distilled water was 95% of the absorption capacity. 20.0 g of ZSM-48/Al$_2$O$_3$ extrudates were impregnated with the NiW-citric acid solution by incipient wetness. After impregnation, the catalyst was dried in air at 120° C. for 16 hrs. The catalyst contains 3% Ni and 15.5% W.

Preparation of Catalysts Incorporating Other Framework Structures: Extrudates of ZSM-48/Al$_2$O$_3$—SiO$_2$, USY/Al$_2$O$_3$, ZSM-11/Al$_2$O$_3$, ZSM-48/MCM-49/Al$_2$O$_3$, ZSM-12/Al$_2$O$_3$, EMM-17/SiO, were also used in catalyst preparations of supported NiW catalysts. The metal loading in all of these samples was 3.0% Ni and 15.5% W.

Preparation of NiMo/ZSM-48/Al$_2$O$_3$ catalyst: NiMo was impregnated on ZSM-48/Al$_2$O$_3$ similarly as NiW impregnated on ZSM-48/Al$_2$O$_3$ with citric acid as dispersion aide. The Ni and Mo precursor compounds used in the catalyst preparations were nickel carbonate hydroxide tetrahydrate and ammonium heptamolybdate tetrahydrate. The catalyst contains 3.2% Ni and 8.7% Mo, and the molar ratio of citric acid (CA)/Ni is also 2. The moles of Ni and Mo in the catalyst are equal to the moles of Ni and W in the sample of 3% Ni+15.5% W/ZSM-48/Al$_2$O$_3$, respectively.

Preparation of CoMo/ZSM-48/Al$_2$O$_3$ catalyst: CoMo was impregnated on ZSM-48/Al$_2$O$_3$ similarly with dispersion aide of citric acid. The Co and Mo precursor compounds used in the catalyst preparation were cobalt carbonate and ammonium heptamolybdate tetrahydrate. The metal loading in these samples are 3.0% Co and 15.5% Mo.

Preparation of NiCoMo/ZSM-48/Al$_2$O$_3$ catalyst: Trimetallic NiCoMo was also prepared using ZSM-48/Al$_2$O$_3$ support with dispersion aide of citric acid. The Ni, Co and Mo precursor compounds used in the catalyst preparations were nickel carbonate hydroxide tetrahydrate, cobalt carbonate and ammonium heptamolybdate tetrahydrate. The metal loading in these samples are 1.7% Ni, 1.7% Co and 14% Mo.

The catalysts made according to the above preparations had N2 BET (Brunauer, Emmett Teller) surface areas ranging from 200 m$^2$/g to 680 m$^2$/g. The pore volume ranged from 0.45 ml/g to 0.85 ml/g. The average pore diameter ranged from 6.0 nm to 18.0 nm.

The cracking activity of the catalysts was also characterized by determining an Alpha value. Most of the catalysts had an Alpha value between 10 and 100, although the catalyst based on ZSM-12 had an Alpha value of roughly 310. To determine an Alpha value, catalysts were sized to 14-25 mesh and tested on n-hexane conversion at 1000° F. (538° C.) in a Quartz plug flow reactor at atmospheric pressure. The feed consisted of a mixture of n-hexane in helium, at a hexane partial pressure of 100 Torr (133 mbar). Four data points were measured at 4 minutes, 11 minutes, 18 minutes, and 25 minutes time on stream. The n-hexane cracking activity, expressed as Alpha, was defined as the first order rate constant for n-hexane conversion relative to a silica-alumina standard. The Alpha value was taken after 18 min time of stream. The reaction products $C_1$-$C_5$ hydrocarbons were analyzed by GC. Aromatics were not analyzed. Catalysts were tested at different weight loadings to vary conversion between 5% and 25%.

Example 3—Yields and Cloud Point Reductions from Isomerization/Dewaxing

In addition to deoxygenation, a variety of isomerization/dewaxing catalysts were investigated for distillate yield and for cloud point reduction. Some of the distillate yield and cloud point reduction tests were performed based on the products for the experimental runs shown in Table 6. Table 7 shows the cloud point reduction and jet plus diesel yield (121° C.+ yield) for the runs shown in Table 6. For the data in Table 7, the cloud point data corresponds to cloud point for the 121° C.+ portion of the product. The cloud point reduction is relative to the cloud point of the starting feed. As noted above, for the runs in Table 6 and Table 7, the hydrotreating catalysts were maintained at 200° C., so that a substantial portion of the deoxygenation is also performed by the isomerization catalyst. Cloud point was measured according to ASTM D2500.

In Table 7, most of the catalysts formed using a dispersion agent provided improved cloud point reduction at the isomerization temperature relative to the catalyst formed without the dispersion agent, although this was accompanied by a decrease in 121° C.+ yield. The exception was the catalyst based on silica-bound EMM-17. For that catalyst, the cloud point reduction and 121° C.+ yield were comparable to the catalyst based on alumina-bound ZSM-48 that was made without a dispersion agent. However, the amount of $CO_2$ generated was increased relative to the amount of water, indicating that EMM-17 still provided some benefit in modifying the reaction pathway.

It is further noted that some catalysts provided a further unexpected benefit with regard to having a favorable combination of increasing the amount of cloud point reduction while reducing or minimizing the amount of yield loss. In particular, the catalysts including ZSM-48 as at least a portion of the zeolitic framework in the catalyst support provided superior combinations of cloud point reduction and 121° C.+ yield.

Additional characterization of cloud point reduction and 121° C.+ yield was performed for catalyst systems where a substantial portion of the deoxygenation was performed over the hydrotreating catalysts located upstream in the reactor from the isomerization catalyst. In these additional characterizations, the yield and cloud point reduction benefits represent the benefits that can be achieved when the isomerization catalyst primarily performs isomerization, due to the feed having a reduced or minimized content of organic oxygen by the time the feed reaches the isomerization catalyst.

One type of characterization was to investigate the impact of the type of catalytic metal on the catalyst. For this characterization, ZSM-48 based catalysts with various types of metal loadings were tested. Table 8 shows the results from these additional tests. Similar to Table 7, the presence of an asterisk next the metals indicates that citric acid (2:1 molar ratio relative to Ni) was used as a dispersion agent during

TABLE 7

Jet Plus Diesel Yield and Cloud Point Reduction For Deoxygenation Plus Isomerization over Isomerization/Dewaxing Catalyst

| Catalyst | Isomerization bed temperature (° C.) | CO yield (wt %) | CO2 yield (wt %) | H2O yield* (wt %) | Delta Cloud (° C.) | 121° C.+ yield (Jet plus Diesel) |
|---|---|---|---|---|---|---|
| NiW/alumina-bound ZSM-48 | 354 | 0.11 | 3.53 | 3.42 | 14 | 76.9 |
| NiMo*/alumina-bound ZSM-48 (NiMo with the same moles of metals as NiW/alumina-bound ZSM-48) | 354 | 0.25 | 3.80 | 2.46 | 26 | 62.4 |
| 50/50 stack of i) NiW*/alumina-bound ZSM-11 and ii) NiW/alumina-bound ZSM-48 | 354 | 0.11 | 4.95 | 1.72 | 47 | 48.4 |
| NiW*/ZSM-48 bound with MCM-49/Alumina | 354 | 0.10 | 5.10 | 2.31 | 69 | 22.9 |
| SiC | 354 | 0.03 | 0.07 | 1.13 |  | 99.4 |
| NiW*/alumina-bound ZSM-12 | 354 | 0.13 | 5.19 | 2.20 | 47 | 17.3 |
| NiW*/silica-bound EMM-17 | 354 | 0.03 | 4.88 | 3.10 | 15 | 74.0 |
| NiW*/alumina-bound ZSM-11 | 354 | 0.11 | 5.39 | 2.46 | 59 | 17.3 | formation of the catalyst. For the results in Table 8, the feed was exposed to the same two hydrotreating catalysts prior to exposure to the isomerization catalyst, but the temperature for the hydrotreating catalyst exposure was 585° F. (307° C.), so that the feed was substantially deoxygenated prior to reaching the isomerization catalyst. In other words, the results in Table 8 correspond to isomerization of a deoxygenated effluent. A separation was not performed between the hydrotreatment catalyst bed and the isomerization catalyst bed, so the by-products of deoxygenation were present in the isomerization reaction environment.

It is noted that the final row in Table 8 corresponds to the CO, $CO_2$, and $H_2O$ yields represent the differential between the original bio-derived feed and the 121° C.+ portion of the isomerized effluent. It is noted that the final row in Table 8 corresponds to results obtained when SiC was loaded in the bed for the isomerization catalyst. Since SiC alone has little or no activity, the final row represents characterization of the deoxygenated effluent without exposure to an isomerization catalyst. It is noted that after the deoxygenation, the cloud point of the resulting deoxygenated effluent was actually higher than the cloud point of the starting feed.

bio-derived feeds. At the same temperature, an unexpectedly higher degree of cloud point reduction was achieved for the same feed. It is noted that NiW is a higher activity combination of metals than CoMo or NiCoMo. Thus, even though the final two rows of Table 8 (NiCoMo or CoMo with dispersion agent) have cloud point reductions similar to the first row of Table 8 (NiW without dispersion agent), this still represents an unexpected activity improvement when using the dispersion agent, as NiCoMo or CoMo metal combinations would be expected to provide lower activity than NiW.

Example 4—Product Yields for Isomerization of a Deoxygenated Effluent

Additional characterization of the products from the catalyst activity tests in Tables 7 and 8 was performed to determine selectivity for producing jet and/or diesel boiling range compounds during the isomerization of a deoxygenated effluent. Table 9 shows results related to changes in selectivity as the metals supported on the zeolitic support are modified for the catalysts in Table 8.

TABLE 8

Jet Plus Diesel Yield and Cloud Point Reduction for Isomerization of Deoxygenated Effluent Over Isomerization Catalyst

| Catalyst | Isomerization bed temperature (° C.) | CO yield (wt %) | CO2 yield (wt %) | H2O yield* (wt %) | Delta Cloud (° C.) | 121° C.+ yield (Jet plus Diesel) |
|---|---|---|---|---|---|---|
| NiW/alumina-bound ZSM-48 | 349 | 0.2 | 0.9 | 2.7 | 6 | 84.3 |
| NiW*/alumina-bound ZSM-48 (Same weights of metals as NiW/alumina-bound ZSM-48) | 349 | 0.2 | 0.9 | 3.4 | 19 | 78.8 |
| NiMo*/alumina-bound ZSM-48 (NiMo with the same weights of metals as NiW/alumina-bound ZSM-48) | 352 | 0.2 | 0.8 | 3.0 | 10 | 74.6 |
| NiW*/silica-alumina-bound ZSM-48 | 349 | 0.1 | 0.8 | 3.3 | 14 | 90.0 |
| 50/50 stack of i) NiW*/alumina-bound FAU framework and ii) NiW/alumina-bound ZSM-48 | 349 | 0.2 | 0.7 | 3.0 | 11 | 76.1 |
| CoMo*/alumina-bound ZSM-48 | 352 | 0.2 | 0.6 | 3.2 | 6 | 76.1 |
| NiCoMo*/alumina-bound ZSM-48 | 352 | 0.2 | 0.7 | 3.4 | 7 | 74.6 |
| SiC | (N/A) | 0.1 | 0.5 | 1.9 | −3 | 95.2 |

As shown in the first two rows of Table 8, using a dispersion agent to form an isomerization catalyst based on ZSM-48 provides an activity advantage for isomerization of

TABLE 9

Product Selectivity during Isomerization of Deoxygenated Feed (Variation of Metals)

| Catalyst | Isom bed temp (° C.) | Conversion (300° C.+) wt % | Yield $C_1$-$C_4$ (wt %) | Yield $C_5$-121° C. (wt %) | Yield 121° C.-300° C. (wt %) | Delta Cloud (° C.) |
|---|---|---|---|---|---|---|
| NiW/alumina-bound ZSM-48 | 349 | 35 | 6 | 6 | 19 | 6 |

TABLE 9-continued

Product Selectivity during Isomerization of Deoxygenated Feed (Variation of Metals)

| Catalyst | Isom bed temp (° C.) | Conversion (300° C.+) wt % | Yield $C_1$-$C_4$ (wt %) | Yield $C_5$-121° C. (wt %) | Yield 121° C.-300° C. (wt %) | Delta Cloud (° C.) |
|---|---|---|---|---|---|---|
| NiW*/alumina-bound ZSM-48 (Same weights of metals as NiW/alumina-bound ZSM-48) | 349 | 57 | 7 | 10 | 36 | 19 |
| NiMo*/alumina-bound ZSM-48 (NiMo with the same weights of metals as NiW/alumina-bound ZSM-48) | 352 | 49 | 10 | 12 | 24 | 10 |
| NiW*/silica-alumina-bound ZSM-48 | 349 | 30 | 3 | 3 | 20 | 14 |
| 50/50 stack of i) NiW*/alumina-bound FAU framework and ii) NiW/alumina-bound ZSM-48 | 349 | 53 | 7 | 12 | 29 | 11 |
| CoMo*/alumina-bound ZSM-48 | 352 | 41 | 9 | 11 | 18 | 6 |
| NiCoMo*/alumina-bound ZSM-48 | 352 | 45 | 10 | 11 | 20 | 7 |
| SiC | (N/A) | 10 | 2 | 0 | 6 | −3 |

As shown in Table 9, the catalysts formed using a dispersion agent provided higher conversions at (substantially) constant temperature relative to the catalyst formed without use of the citric acid dispersion agent. For the catalysts containing only Ni as a Group 8-10 metal, the catalysts formed using the dispersion agent also had higher selectivity for forming conversion products in the range of 121° C. to 300° C. For catalysts including Co, the selectivity of the catalysts formed using the dispersion agent was similar to the selectivity for the NiW catalyst formed without using the dispersion agent. However, higher conversions were still achieved.

Tables 10 and 11 provide similar selectivity results for the catalysts in Table 7. Table 10 shows product selectivity data from performing isomerization at 354° C., while Table 11 shows product selectivity data from performing isomerization at 343° C.

TABLE 10

Product Selectivity during Isomerization at 354° C. of Deoxygenated Feed (Variation of Zeolitic Framework)

| Catalyst | Isom bed temp (° C.) | Conversion (300° C.+) wt % | Yield $C_1$-$C_4$ (wt %) | Yield $C_5$-121° C. (wt %) | Yield 121° C.-300° C. (wt %) | Delta Cloud (° C.) |
|---|---|---|---|---|---|---|
| NiW/alumina-bound ZSM-48 | 354 | 57 | 7.1 | 10.5 | 32.7 | 13 |
| NiMo*/alumina-bound ZSM-48 (NiMo with the same moles of metals as NiW/alumina-bound ZSM-48) | 354 | 77 | 10.2 | 15.7 | 46.0 | 32 |
| 50/50 stack of i) NiW*/alumina-bound ZSM-11 and ii) NiW/alumina-bound ZSM-48 | 354 | 99 | 40.1 | 54.3 | 13.0 | 60 |
| NiW*/ZSM-48 bound with MCM-49/Alumina | 354 | 96 | 20.0 | 29.3 | 40.9 | 77 |
| SiC | 354 | 15 | 2.3 | 0.2 | 8.2 | −1 |
| NiW*/alumina-bound ZSM-12 | 354 | 99 | 51.3 | 44.0 | 6.1 | 24 |
| NiW*/silica-bound EMM-17 | 354 | 97 | 18.1 | 35.6 | 38.1 | 70 |
| NiW*/alumina-bound ZSM-11 | 354 | 100 | 42.8 | 54.6 | 11.2 | 73 |

As shown in Table 10, using the dispersion agent to form an isomerization catalyst provided higher conversion activity, greater cloud point reduction, and or more favorable combinations of conversion and cloud point reduction, as compared with the catalyst formed without using a dispersion agent. It is noted that a substantial activity advantage and cloud point reduction advantage was observed for EMM-17.

Table 11 shows characterization data from runs where isomerization was performed at 343° C. instead of 354° C. Table 11 shows that the benefits in activity and/or cloud point reduction for catalysts formed using a dispersion agent are maintained as the temperature is varied.

isomerization catalyst shown in row 1 of Table 8. Thus, Sample A is NiW supported on alumina-bound ZSM-48 made without use of a dispersion agent. Sample B corresponds to the isomerization catalyst shown in row 2 of Table 8 (NiW supported on alumina-bound ZSM-48, made with a dispersion agent). Sample C corresponds to the isomerization catalyst shown in row 3 of Table 8 (NiMo supported on alumina-bound ZSM-48, made with a dispersion agent).

TABLE 11

Product Selectivity during Isomerization at 343° C. of Deoxygenated Feed
(Variation of Zeolitic Framework)

| Catalyst | Isom bed temp (° C.) | Conversion (300° C.+) wt % | Yield $C_1$-$C_4$ (wt %) | Yield $C_5$-121° C. (wt %) | Yield 121° C.-300° C. (wt %) | Delta Cloud (° C.) |
|---|---|---|---|---|---|---|
| NiW/alumina-bound ZSM-48 | 354 | 33.0 | 3.4 | 3.1 | 21.3 | 4 |
| NiMo*/alumina-bound ZSM-48 (NiMo with the same moles of metals as NiW/alumina-bound ZSM-48) | 354 | 46.8 | 4.2 | 5.2 | 32.8 | 13 |
| 50/50 stack of i) NiW*/alumina-bound ZSM-11 and ii) NiW/alumina-bound ZSM-48 | 354 | 67.5 | 12.0 | 22.7 | 26.0 | 12 |
| NiW*/ZSM-48 bound with MCM-49/ Alumina | 354 | 74.9 | 10.7 | 15.6 | 42.9 | 41 |
| SiC | 354 | 15.3 | 2.3 | 0.2 | 8.6 | 1 |
| NiW*/alumina-bound ZSM-12 | 354 | 98.3 | 40.3 | 51.6 | 8.9 | 38 |
| NiW*/silica-bound EMM-17 | 354 | 60.2 | 6.4 | 13.0 | 35.1 | 16 |
| NiW*/alumina-bound ZSM-11 | 354 | 98.0 | 25.6 | 43.3 | 22.1 | 49 |

Example 5—Characterization of Metal Dispersion

Additional characterization was performed on isomerization catalysts formed using a dispersion agent to determine how the presence of the dispersion agent impacted the nature of the resulting catalyst. For this analysis, the catalyst samples corresponded to spent catalyst samples from the cloud point and yield characterizations shown in Table 8. Thus, the catalysts corresponded to spent, sulfuided catalysts.

The catalyst samples were prepared for TEM analysis by crushing them into fines (<100 nm thick pieces) using an agate mortar and pestle. The fines were dusted onto standard, 200 mesh, holey-carbon-coated Cu grids. Each grid was examined in the bright field TEM imaging mode of a JEM 200F TEM/STEM operated at an accelerating voltage of 200 kV. Digital images of randomly-selected areas were collected using a Gatan One View CCD camera and Digital Micrograph software. The images were analyzed by manually by counting the number of layers associated with more than 500 individual particles. The layer count data input into KaleidaGraph. KaleidaGraph software was used to generate a histogram (i.e., plot indicating the number of layers vs the number of particles of a given layer) and to calculate the mean and median number of layers per particle for a given material.

Figure 6:
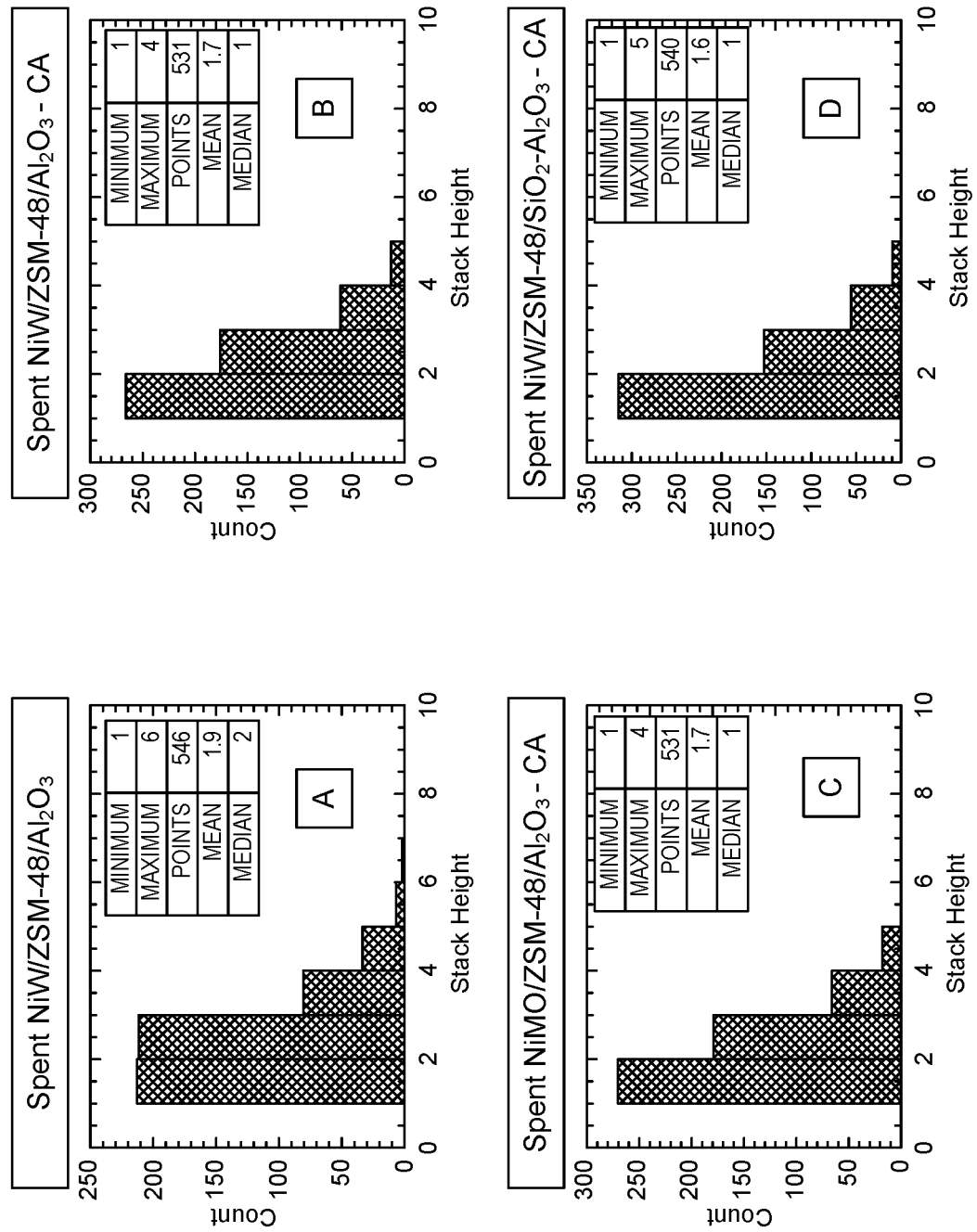
FIG. 6 shows metal layer stack height measurements for isomerization catalysts made with and without dispersion agent.

The use of dispersion aids improves metal efficiency as demonstrated by the reduced stack height measured by transmission electron microscopy and displayed in FIG. 6. In FIG. 6, dispersion histograms are shown for four different types of catalyst samples. Sample A corresponds to the Sample D corresponds to the isomerization catalyst shown in row 4 of Table 8 (W supported on silica-alumina-bound ZSM-48, made with a dispersion agent).

As shown in FIG. 6, the ratio of stack heights having a single metal layer versus having two layers (or alternatively two or more layers) is dramatically increased with the use of dispersion aid regardless of binder or metal. The more dispersed metal yields higher activity compared with analogous catalysts that do not use a dispersion aid based on the greater conversion of 572° F.+(300° C.+) components, and/or increased cloud point reduction, and/or reduced cracking rates that lead to lower yields of light ends ($C_1$-$C_4$) and naphtha ($C_5$-121° C.). These benefits of the dispersion aid are observed across all of the metal combinations (NiW, NiMo, CoMo, NiCoMo), different metal loadings (e.g., 3 wt % Ni/15 wt % Mo, and 3 wt % Ni/8.7 wt % Mo) and various binders ($Al_2O_3$ and $SiO_2$—$Al_2O_3$). While the $SiO_2$—$Al_2O_3$ bound ZSM-48 catalyst is lower activity (requires higher temperature to reach the same conversion relative to 300° C.) compared with the NiW/$Al_2O_3$ bound ZSM-48 made without a dispersion aid, the cloud point reduction is sufficiently greater even at lower conversions relative to 300° C.

ADDITIONAL EMBODIMENTS A

Embodiment 1. A method for processing a bio-derived feedstock, comprising: exposing a feed comprising a bio-derived feedstock, the feed having an organic oxygen content of 1.0 wt % or more, to a bulk multimetallic catalyst comprising at least one Group 6 metal and at least one Group 8-10 metal under deoxygenation conditions to form a deoxygenated effluent comprising hydrocarbons, CO, $CO_2$, and water, a weight ratio of $CO_2$ to water in the deoxygenated effluent being 1.0 or more, a weight ratio of CO to $CO_2$ being 0.5 or less; and cascading at least a portion of the deoxygenated effluent to an isomerization catalyst under isomerization conditions to form an isomerized, deoxygenated effluent.

Embodiment 2. The method of Embodiment 1, wherein the bulk multimetallic catalyst comprises Ni and W, Ni and Mo, or Ni, Mo, and W.

Embodiment 3. The method of any of the above embodiments, wherein the bulk multimetallic catalyst comprises a catalyst produced by heating a composition comprising the at least one metal from Group 6 of the Periodic Table of the Elements, the at least one metal from Groups 8-10 of the Periodic Table of the Elements, and a reaction product formed by heating (i) a first organic compound containing at least one amine group, and (ii) a second organic compound separate from said first organic compound and containing at least one carboxylic acid group to a temperature from about 195° C. to about 250° C. for a time sufficient for the first and second organic compounds to form a reaction product in situ that contains an amide moiety, unsaturated carbon atoms not present in the first or second organic compounds, or both, and then sulfiding the composition.

Embodiment 4. The method of any of the above embodiments, wherein the weight ratio of CO to $CO_2$ in the deoxygenated effluent is 0.4 or less.

Embodiment 5. The method of any of the above embodiments, wherein a weight ratio of organic oxygen content in the deoxygenated effluent to the organic oxygen content of the feed is 0.1 or less.

Embodiment 6. The method of any of Embodiments 1 to 4, wherein a weight ratio of organic oxygen content in the deoxygenated effluent to the organic oxygen content of the feed is greater than 0.1.

Embodiment 7. The method of any of the above embodiments, wherein the feed comprises 4.0 wt % or more of organic oxygen, wherein the deoxygenated effluent comprises 0.5 wt % to 4.0 wt % of organic oxygen, and wherein the isomerization catalyst comprises a zeolitic isomerization catalyst, the isomerization catalyst further comprising one or more catalytic metals.

Embodiment 8. The method of Embodiment 7, wherein the one or more catalytic metals comprise at least one of Ni and Co, and at least one of Mo and W; or wherein the one or more catalytic metals are impregnated on the isomerization catalyst in the presence of a dispersion agent; or a combination thereof.

Embodiment 9. The method of any of the above embodiments, wherein the deoxygenation conditions comprise a temperature of 204° C. to 350° C. and a hydrogen partial pressure of 2.8 MPa-g to 6.9 MPa-g.

Embodiment 10. The method of any of the above embodiments, wherein the bulk multimetallic catalyst and the isomerization catalyst are contained within a single reactor.

Embodiment 11. The method of any of the above embodiments, further comprising exposing the feed to a supported base metal catalyst prior to the exposing the feed to the bulk multimetallic catalyst, wherein optionally the supported base metal catalyst, bulk multimetallic catalyst, and the isomerization catalyst are contained within a single reactor.

Embodiment 12. The method of any of the above embodiments, further comprising fractionating the isomerized, deoxygenated effluent to form at least one fraction comprising a 121° C.+ portion.

Embodiment 13. The method of Embodiment 12, wherein the at least one fraction comprises a T10 distillation point of 121° C. or higher and a T90 distillation point of 300° C. or lower, or wherein the at least one fraction comprises a T10 distillation point of 200° C. or higher and a T90 distillation point of 343° C. or lower.

Embodiment 14. The method of Embodiment 12 or 13, further comprising stripping the isomerized, deoxygenated effluent prior to the fractionating.

Embodiment 15. The method of Embodiment 12 or 13, further comprising stripping the isomerized, deoxygenated effluent to form a stripped effluent; and hydroprocessing at least a portion of the stripped effluent.

ADDITIONAL EMBODIMENTS B

Embodiment 16. A method for processing a bio-derived feedstock, comprising: exposing a feed comprising a bio-derived feedstock to an isomerization catalyst comprising a zeolitic framework structure, at least one Group 6 metal, and at least one Group 8-10 metal under isomerization conditions to form an isomerized effluent, the isomerization catalyst having a ratio of metal layer locations comprising a single layer to metal layer locations comprising two layers of 1.1 or more.

Embodiment 17. The method of Embodiment 16, wherein the isomerization catalyst comprises a ratio of metal layer locations comprising a single layer to metal layer locations comprising two layers of 1.5 or more.

Embodiment 18. The method of any of Embodiments 16 to 17, wherein the isomerization catalyst comprises a ratio of metal layer locations comprising a single layer to metal layer locations comprising two or more layers of 1.1 or more.

Embodiment 19. The method of any of Embodiments 16 to 18, wherein the feed comprises 1.0 wt % or more of organic oxygen, a weight ratio of organic oxygen in the isomerized effluent to organic oxygen in the feed being 0.5 or less.

Embodiment 20. The method of Embodiment 19, wherein the feed comprises 1.0 wt % or more of organic oxygen and the isomerized effluent comprises less than 1.0 wt % of organic oxygen.

Embodiment 21. The method of Embodiment 19 or 20, wherein the feed comprises 2.0 wt % or more of organic oxygen, or wherein the isomerized effluent comprises 0.5 wt % or less of organic oxygen, or a combination thereof.

Embodiment 22. The method of any of Embodiments 16 to 21, wherein a cloud point of the 121° C.+ portion of the isomerized effluent is lower than a cloud point of a 121° C.+ portion of the feed by 10° C. or more.

Embodiment 23. The method of any of Embodiments 16 to 22, wherein the feed comprises a hydroprocessed effluent formed by exposure of an initial feed to a hydrotreatment catalyst, the hydroprocessed effluent optionally being cascaded to the isomerization catalyst.

Embodiment 24. The method of any of Embodiment 23, wherein the initial feed comprises an organic oxygen content of 4.0 wt % or more.

Embodiment 25. The method of Embodiment 23 or 24, wherein the hydrotreatment catalyst comprises a bulk multimetallic hydrotreatment catalyst comprising at least one Group 6 metal and at least one Group 8-10 metal, the at least one Group 6 metal optionally comprising Mo, W, or a combination thereof, the at least one Group 8-10 metal optionally comprising Ni, Co, or a combination thereof Embodiment 26. The method of Embodiment 23 or 24, wherein the hydrotreatment catalyst comprises a supported catalyst comprising at least one Group 6 metal and at least one Group 8-10 metal.

Embodiment 27. The method of any of Embodiments 16 to 26, wherein the isomerized effluent further comprises CO, $CO_2$, and water.

Embodiment 28. The method of Embodiment 27, wherein a weight ratio of $CO_2$ to water in the isomerized effluent is 1.2 or more, or wherein a weight ratio of CO to $CO_2$ in the isomerized effluent is 0.5 or less, or a combination thereof.

Embodiment 29. The method of any of Embodiments 16-28, wherein the zeolitic framework structure comprises MRE, MEL, FAU, MWW, MTW, TON, MTT, FER, MFS, the framework structure corresponding to EMM-17, or a combination thereof.

Embodiment 30. The method of any of Embodiments 16-29, wherein the zeolitic framework structure comprises ZSM-48, MCM-49, ZSM-12, USY, EMM-17, ZSM-11, ZSM-22, ZSM-23, ZSM-35, ZSM-57, or a combination thereof.

ADDITIONAL EMBODIMENTS C

Embodiment 31. An isomerization catalyst, comprising a zeolitic framework structure, a binder, at least one first catalytic metal selected from Mo and W, and at least one second catalytic metal selected from Ni and Co, the zeolitic framework structure comprising MWW, MTW, FAU, FER, the framework structure corresponding to EMM-17, or a combination thereof, the catalyst comprising a combined weight of the at least one first catalytic metal and the at least one second catalytic metal of 1.0 wt % to 30 wt % relative to a weight of the catalyst, the catalyst having a ratio of metal layer locations comprising a single layer to metal layer locations comprising two layers of 1.1 or more.

Embodiment 32. The catalyst of Embodiment 31, wherein the catalyst comprises a ratio of metal layer locations comprising a single layer to metal layer locations comprising two layers of 1.5 or more.

Embodiment 33. The catalyst of Embodiment 31 or 32, wherein the catalyst comprises a ratio of metal layer locations comprising a single layer to metal layer locations comprising two or more layers of 1.1 or more.

Embodiment 34. The catalyst of any of Embodiments 31 to 33, wherein the zeolitic framework structure comprises MWW, MTW, FAU, the framework structure corresponding to EMM-17, or a combination thereof.

Embodiment 35. The catalyst of any of Embodiments 31 to 33, wherein the catalyst comprises MCM-49, ZSM-12, USY, EMM-17, or a combination thereof.

Embodiment 36. The catalyst of any of Embodiments 31 to 35, wherein the catalyst comprises a sulfided catalyst.

Embodiment 37. The catalyst of any of Embodiments 31 to 36, wherein the catalyst comprises Ni and at least one of Mo and W, the catalyst optionally being substantially free of Pt, Pd, Ru, Rh, Os, and Ir.

Embodiment 38. A method of making an isomerization catalyst, comprising: impregnating a support comprising a zeolitic framework structure with a solution comprising a metal salt of at least one first catalytic metal selected from Mo and W, a metal salt of at least one second catalytic metal selected from Ni and Co, and a dispersion agent, the zeolitic framework structure comprising MWW, MTW, FAU, FER, the framework structure corresponding to EMM-17, or a combination thereof, the dispersion agent comprising an alcohol, a carboxylic acid, or a combination thereof having 5-15 carbon atoms; and drying the impregnated support at a temperature of about 80° C. to about 200° C. to form a catalyst, the catalyst having a ratio of metal layer locations comprising a single layer to metal layer locations comprising two layers of 1.1 or more.

Embodiment 39. The method of Embodiment 38, wherein the dispersion agent comprises a carbon atom to oxygen atom ratio of 0.6 to 2.0, or wherein the dispersion agent further comprises an amine, or a combination thereof.

Embodiment 40. The method of Embodiment 38 or 39, wherein a molar ratio of dispersion agent to the at least one second catalytic metal is 0.5 to 5.0.

Embodiment 41. The method of any of Embodiments 38 to 40, further comprising sulfiding the catalyst to form a sulfided catalyst, the sulfided catalyst having a ratio of metal layer locations comprising a single layer to metal layer locations comprising two layers of 1.1 or more.

Embodiment 42. The method of Embodiment 41, wherein the sulfided catalyst comprises a ratio of metal layer locations comprising a single layer to metal layer locations comprising two layers of 1.5 or more, or wherein the sulfided catalyst comprises a ratio of metal layer locations comprising a single layer to metal layer locations comprising two or more layers of 1.1 or more, or a combination thereof.

Embodiment 43. The method of any of Embodiments 38 to 42, wherein the zeolitic framework structure comprises MWW, MTW, FAU, the framework structure corresponding to EMM-17, or a combination thereof.

Embodiment 44. The method of any of Embodiments 38 to 43, wherein the catalyst comprises MCM-49, ZSM-12, USY, EMM-17, or a combination thereof.

Embodiment 45. The catalyst of any of Embodiments 31 to 37 or the method of any of Embodiments 38 to 44, wherein the catalyst comprises 20 wt % to 80 wt % of the zeolitic framework structure, relative to a weight of the catalyst, or wherein the catalyst comprises a combined weight of the at least one first catalytic metal and the at least one second catalytic metal of 5.0 wt % to 30 wt % relative to a weight of the catalyst, or a combination thereof.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for processing a bio-derived feedstock, comprising:
exposing a feed comprising a bio-derived feedstock to an isomerization catalyst comprising a zeolitic framework structure, at least one Group 6 metal, and at least one Group 8-10 metal under isomerization conditions to form an isomerized effluent, wherein the isomerized effluent comprises CO, $CO_2$, and water, the isomerization catalyst having a ratio of metal layer locations comprising a single layer to metal layer locations comprising two layers of 1.1 or more.

2. The method of claim 1, wherein the isomerization catalyst comprises a ratio of metal layer locations comprising a single layer to metal layer locations comprising two layers of 1.5 or more.

3. The method of claim 1, wherein the isomerization catalyst comprises a ratio of metal layer locations comprising a single layer to metal layer locations comprising two or more layers of 1.7 or more.

4. The method of claim 1, wherein the feed comprises 1.0 wt % or more of organic oxygen, a weight ratio of organic oxygen in the isomerized effluent to organic oxygen in the feed being 0.5 or less.

5. The method of claim 4, wherein the feed comprises 2.0 wt % or more of organic oxygen.

6. The method of claim 1, wherein the feed comprises 1.0 wt % or more of organic oxygen and the isomerized effluent comprises less than 1.0 wt % of organic oxygen.

7. The method of claim 6, wherein the isomerized effluent comprises 0.5 wt % or less of organic oxygen.

8. The method of claim 6, wherein the feed comprises 2.0 wt % or more of organic oxygen.

9. The method of claim 1, wherein a cloud point of 121° C.+ portion of the isomerized effluent is lower than a cloud point of a 121° C.+ portion of the feed by 10° C. or more.

10. The method of claim 1, wherein the feed comprises a hydroprocessed effluent formed by exposure of an initial feed to a hydrotreatment catalyst.

11. The method of claim 1, wherein the initial feed comprises an organic oxygen content of 4.0 wt % or more.

12. The method of claim 10, wherein the hydroprocessed effluent is cascaded to the isomerization catalyst.

13. The method of claim 10, wherein the hydrotreatment catalyst comprises a bulk multimetallic hydrotreatment catalyst comprising at least one Group 6 metal and at least one Group 8-10 metal.

14. The method of claim 10, wherein the hydrotreatment catalyst comprises a supported catalyst comprising at least one Group 6 metal and at least one Group 8-10 metal.

15. The method of claim 1, wherein the isomerization catalyst comprising a zeolitic framework structure is formed using a dispersion agent and drying process at a temperature of about 80° C. to about 200° C.

16. The method of claim 1, wherein a weight ratio of $CO_2$ to water in the isomerized effluent is 1.2 or more.

17. The method of claim 1, wherein a weight ratio of CO to $CO_2$ in the isomerized effluent is 0.5 or less.

18. The method of claim 1, wherein the at least one Group 6 metal comprises Mo, W, or a combination thereof, and wherein the at least one Group 8-10 metal comprises Ni, Co, or a combination thereof.

19. The method of claim 1, wherein the zeolitic framework structure comprises MRE, MEL, FAU, MWW, MTW, TON, MTT, FER, MFS, the framework structure corresponding to EMM-17, or a combination thereof.

20. The method of claim 1, wherein the zeolitic framework structure comprises ZSM-48, MCM-49, ZSM-12, USY, EMM-17, ZSM-11, ZSM-22, ZSM-23, ZSM-35, ZSM-57, or a combination thereof.

* * * * *